(12) United States Patent
Wallner et al.

(10) Patent No.: US 10,863,160 B2
(45) Date of Patent: Dec. 8, 2020

(54) CONDITIONAL FORCED PERSPECTIVE IN SPHERICAL VIDEO

(71) Applicant: Liquid Cinema Inc. Canada, Toronto (CA)

(72) Inventors: Thomas Wallner, Toronto (CA); Franz Hildgen, Toronto (CA)

(73) Assignee: Liquid Cinema Inc. Canada, Toronto (CA)

( * ) Notice: Subject to any disclaimer, the term of this patent is extended or adjusted under 35 U.S.C. 154(b) by 0 days.

(21) Appl. No.: 16/504,820

(22) Filed: Jul. 8, 2019

(65) Prior Publication Data
US 2020/0053339 A1 Feb. 13, 2020

Related U.S. Application Data

(60) Provisional application No. 62/716,316, filed on Aug. 8, 2018.

(51) Int. Cl.
*H04N 13/15* (2018.01)
*H04N 13/106* (2018.01)
(Continued)

(52) U.S. Cl.
CPC ......... *H04N 13/158* (2018.05); *H04N 13/366* (2018.05); *H04N 13/398* (2018.05)

(58) Field of Classification Search
CPC .... G06T 15/20; H04N 13/398; H04N 13/158; H04N 13/366
See application file for complete search history.

(56) References Cited

U.S. PATENT DOCUMENTS

| 6,859,799 B1 | 2/2005 | Yuen |
| 8,762,890 B2 | 6/2014 | Falchuk et al. |

(Continued)

OTHER PUBLICATIONS

Blender Reference Manual; http://blender-manual-l18n.readthedocs.io/ja/latest/render/blender_render- /textures/mapping/uv/unwrapping.html; May 2011.

(Continued)

*Primary Examiner* — Neil R Mikeska
(74) *Attorney, Agent, or Firm* — Dickinson Wright LLP; Matthew D. Powell

(57) ABSTRACT

A processor-implemented method in a digital media player includes receiving data defining a user's viewport in relation to spherical video frames displayed by the digital media player; and where a forced perspective event is to be triggered at the time of display of a spherical frame, triggering the forced perspective event conditionally based at least on the orientation of the user's viewport in relation to the spherical video frames. A digital media player includes processing structure for receiving data defining a user's viewport in relation to spherical video frames displayed by the digital media player; and processing structure for, where a forced perspective event is to be triggered at the time of display of a spherical frame, triggering the forced perspective event conditionally based at least on the orientation of the user's viewport in relation to the spherical video frames. A processor-readable medium embodying a computer program for a digital media player is provided. The computer program includes program code for receiving data defining a user's viewport in relation to spherical video frames displayed by the digital media player; and program code for, where a forced perspective event is to be triggered at the time of display of a spherical frame, triggering the forced perspective event conditionally based at least on the orien- (Continued)

tation of the user's viewport in relation to the spherical video frames.

8 Claims, 19 Drawing Sheets

(51) Int. Cl.
*H04N 13/366* (2018.01)
*H04N 13/398* (2018.01)

(56) References Cited

U.S. PATENT DOCUMENTS

| | | | |
|---|---|---|---|
| 10,182,210 B1* | 1/2019 | Goetzinger, Jr. | H04N 7/142 |
| 10,587,856 B1* | 3/2020 | Fontvielle | H04N 13/117 |
| 2007/0294173 A1 | 12/2007 | Levy et al. | |
| 2011/0310414 A1 | 12/2011 | Morimoto et al. | |
| 2012/0140978 A1 | 6/2012 | Kim et al. | |
| 2012/0170803 A1 | 7/2012 | Millar et al. | |
| 2012/0256911 A1 | 10/2012 | Nakamura | |
| 2014/0098296 A1 | 4/2014 | Arora et al. | |
| 2015/0109406 A1 | 4/2015 | Carlsson et al. | |
| 2015/0281507 A1 | 10/2015 | Konen et al. | |
| 2016/0104055 A1 | 4/2016 | Lin et al. | |
| 2017/0052680 A1 | 2/2017 | Chegini | |
| 2017/0124398 A1 | 5/2017 | Birkbeck | |
| 2017/0339341 A1* | 11/2017 | Zhou | H04N 5/23238 |
| 2017/0339392 A1 | 11/2017 | Forutanpour et al. | |
| 2017/0353706 A1 | 12/2017 | Stelmack et al. | |
| 2018/0005447 A1 | 1/2018 | Wallner et al. | |
| 2018/0005449 A1 | 1/2018 | Wallner et al. | |
| 2018/0007262 A1* | 1/2018 | Rantala | G06F 3/013 |
| 2018/0092706 A1* | 4/2018 | Anderson | G06F 3/012 |
| 2019/0200084 A1* | 6/2019 | Gilson | H04L 65/4076 |

OTHER PUBLICATIONS

"Texture and other Mappings Angel Chapter 7 Computer Graphics 15-462", Feb. 1, 2002, http://www.cs.cmu.edu/~djames/15-462/Fall03/notes/09-texture.pdf.

"Creating Textures for Celestia", https://www.classe.cornell.edu/~seb/celestia/textures.html.

* cited by examiner

Trigger Forced Perspective

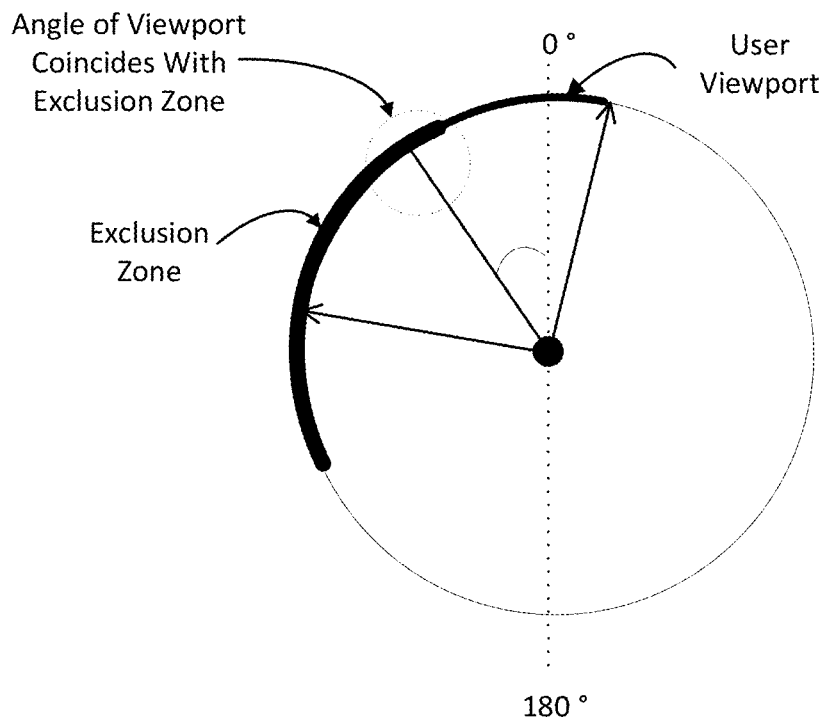
Do Not Trigger Forced Perspective
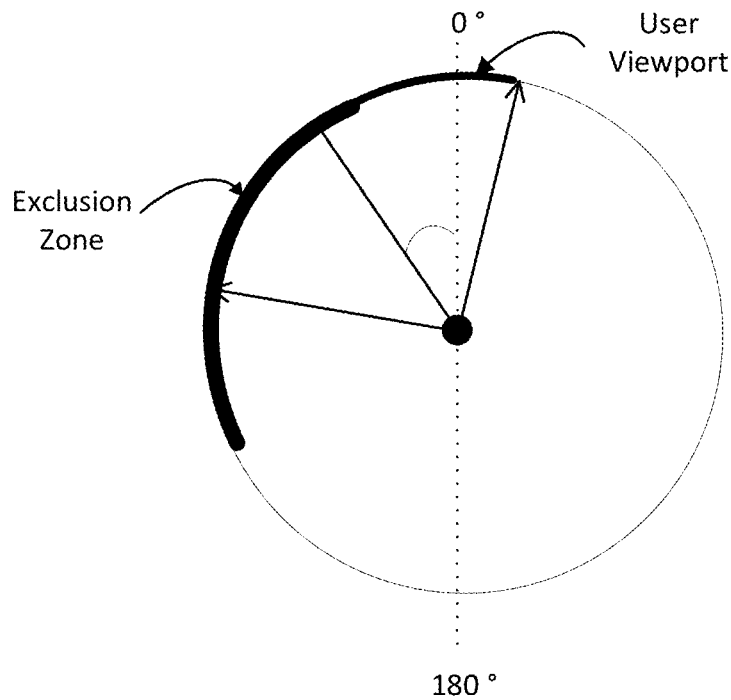

Trigger Forced Perspective

Do Not Trigger Forced Perspective

Do Not Trigger Forced Perspective

Do Not Trigger Forced Perspective

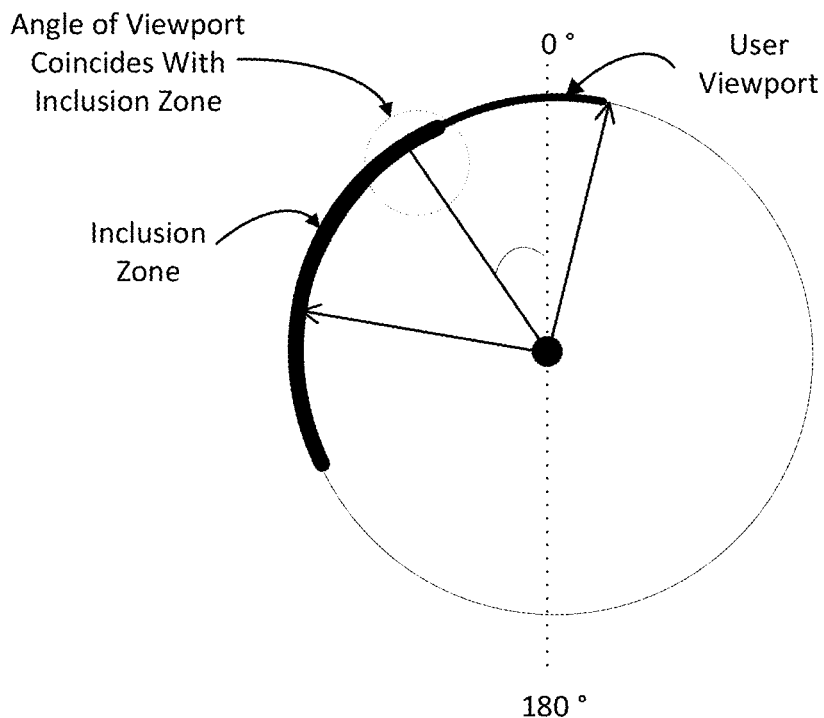
FIG. 14A
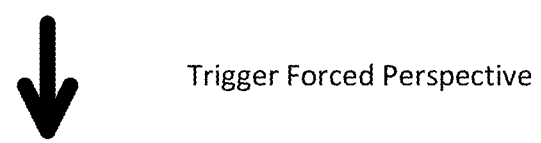
Trigger Forced Perspective
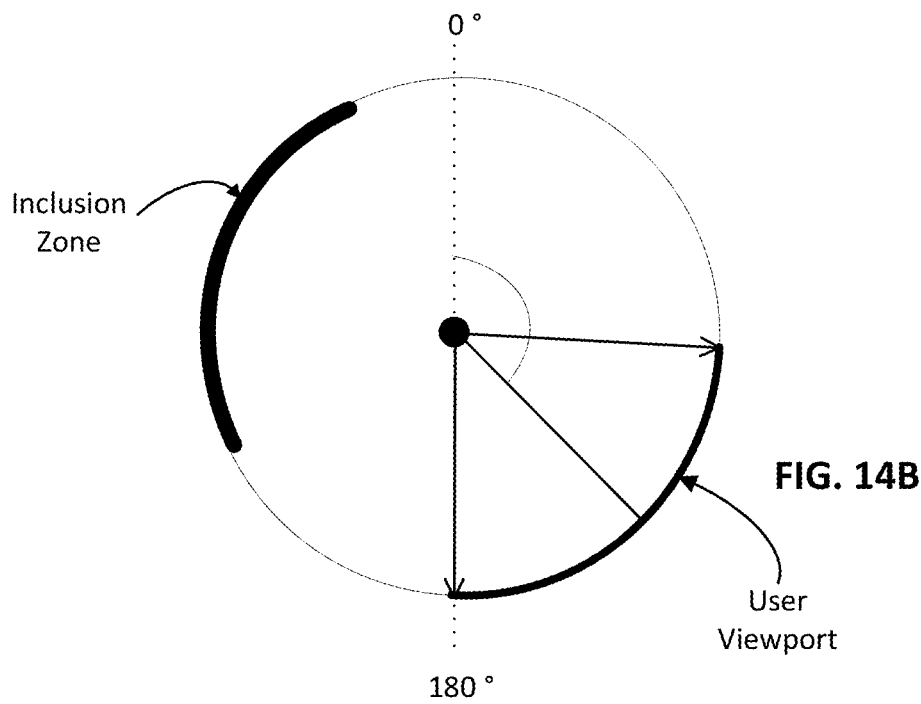
FIG. 14B

Trigger Forced Perspective A

Do Not Trigger Any Forced Perspective

CONDITIONAL FORCED PERSPECTIVE IN SPHERICAL VIDEO

CROSS-REFERENCE TO RELATED APPLICATION

This application claims priority under 35 U.S.C. 120 to U.S. Provisional Patent Application Ser. No. 62/716,316 filed on Aug. 8, 2018, the contents of which are incorporated by reference in their entirety.

FIELD OF THE INVENTION

The following relates generally to electronic data processing, and more particularly to systems and methods for processing digital video.

BACKGROUND OF THE INVENTION

A wide variety of computing devices such as gaming consoles, virtual-reality equipment, augmented-reality equipment, mixed-reality equipment, smart televisions, set top boxes, desktop computers, laptops, smartphones, and specialty devices such as iPods, are available to consumers. The computing capabilities of many of these devices can be harnessed by creative content producers to provide very rich, immersive and interactive media content.

For example, filmmakers, digital content creators and technology developers have been developing 360-video capture systems, corresponding authoring tools and compatible media players to create and present interactive and immersive media experiences for a variety of platforms including virtual reality. Such video capture systems include multiple individual but coordinated video cameras positioned in an array in which each camera has a unique position and field of view to collectively capture video that spans 360×180 degrees. Frames of the captured digital video from the video cameras are synchronized and stitched together using image processing algorithms to produce video frames each of which contains 360×180 content. Each of these video frames is typically stored in an equirectangular format, to facilitate straightforward projection onto a geometry such as a spherical mesh for playback.

A user can be provided with the impression that he or she is positioned at the centre of the sphere looking outward towards the captured scenes, in a manner analogous to the position of the cameras during video capture. In addition, the user may be provided with the ability to adjust his or her perspective and field of view—the viewport—such as by using a mouse on a desktop-style system, a touch-display on a typical smartphone, or actual physical movement using virtual reality headgear (Head Mounted Display, or HMD), in order to face any part of the 360×180 video that is being played back. In this way, the user can "look around" and in any direction will see the respective portions of the film unfolding as it is played back just as one can look around in reality.

Processes for producing digital video from raw content such as that captured by a 360-video capture system are well understood. Speciality software tools are used to stitch together the content from the different camera angles to produce the raw video. Then, the raw video can be edited and spliced with other video, graphic overlays and the like, on a computer workstation using software tools. When the author/editor is satisfied with the content, the digital video is considered "locked," and post-production tools can be used to convert the locked digital video into a form suitable for transmission, playback and storage using various media players, devices and the like. For example, it is typical to encode raw video into a format such as MP4 using H.264 or H.265 to compress the video so that the overall file in which it is contained is smaller and wieldy for storage and transmission. Encoders are sets of hardware and software that receive the original raw digital video content as input and that output an encoded digital video file. Transcoders are sets of hardware and software that receive an encoded video file and re-encode the file into a different encoded format. Decoders are sets of hardware and software that receive an encoded video file, and extract each frame as pixel data so that the pixel data can be inserted into a memory buffer which can be later stored in a frame buffer for subsequent display by a display device. Together, coders/transcoders and decoders are typically referred to as codecs.

When authoring digital videos, an author/editor may wish to add certain events which are to be triggered by a media player during playback. Parameters specifying such events and their exact timing may be stored as metadata in a file associated with the digital video, such as an XML (eXtensible Markup Language) or JSON (JavaScript Object Notation) file. Such event records may be identified according to frame number or playback time; the events are to be triggered for execution by a media player at the time of display of a particular frame number or at a particular time lapsed since beginning playback. Such frames may be referred to as "event-triggering frames". Various examples of such events and how they may be triggered are provided in United States Patent Application Publication No. 2018/0005447 to Wallner et al., and in United States Patent Application Publication No. 2018/0005449 to Wallner et al., the contents of each of which are incorporated herein by reference in their entirety.

One example of an event that the author/editor may wish to trigger the media player to conduct at particular times during the playback of spherical video is a "forced perspective" event. Users' freedom to "look around" at different portions of the spherical video can compete somewhat with the author/editor's desire to properly present users with particular visual narrative events or actions. That is, if users are exercising their freedom to look at any region of the spherical video frames while an important narrative event or action is available to be seen at a different region within the spherical video frames, some users may miss seeing that narrative event or action. For preventing this, an author/editor during editing may add a forced perspective event in association with a particular frame, so that the media player when displaying that particular frame will automatically orient the user's viewport at a particular juncture. This is used to force every user to the perspective of the region of the scene that the author/editor intended. Once a forced perspective event is triggered, control over the viewport is typically immediately released back to the user, so the user can continue to look around starting from the perspective to which they were forced. In a sense, particularly within a scene, a user can perceive a forced perspective in spherical video as an effect similar to a "cut" in traditional flat video.

When, during playback and just prior to a forced perspective event, a user's existing perspective (as defined by his or her viewport) is quite different from that to which the user will be forced, the subsequent automatic forcing of that user's perspective is not typically experienced as jarring. Users tend to accept such "cuts" as a matter of course, as they do with traditional flat video. However, as with traditional flat video, when a user's perspective is similar to that to which the user will be forced, the subsequent forcing of that user's perspective can be experienced as jarring. While such automatic cuts may be intended by the author/editor as tools for imparting style or advancing narrative (such as deliberately injecting jump cuts), it is desirable that the author/editor maintain control over whether such cuts occur. However, with spherical video, since the author/editor cannot anticipate with certainty in which direction every user who will ever view the spherical digital video will be gazing, there is a risk that some users will experience unintended cuts, whereas other users will not.

SUMMARY OF THE INVENTION

In accordance with an aspect, there is provided a processor-implemented method in a digital media player, the method comprising receiving data defining a user's viewport in relation to spherical video frames displayed by the digital media player; and where a forced perspective event is to be triggered at the time of display of a spherical frame, triggering the forced perspective event conditionally based at least on the orientation of the user's viewport in relation to the spherical video frames.

In an embodiment, triggering the forced perspective event conditionally comprises triggering the forced perspective event only if the user's viewport does not coincide with an exclusion zone associated with the spherical frame.

In an embodiment, triggering the forced perspective event conditionally comprises triggering the forced perspective event only if the user's viewport does not coincide for a threshold duration with an exclusion zone associated with the spherical frame.

In an embodiment, triggering the forced perspective event conditionally comprises triggering the forced perspective event only if the user's viewport coincides with an inclusion zone associated with the spherical frame.

In an embodiment, the processor-implemented method further comprises, where one of a plurality of forced perspective events is to be triggered at the time of display of the spherical frame, selecting none or one of the plurality of forced perspective events to be triggered conditionally based at least on the orientation of the user's viewport in relation to the spherical video frames, the selecting comprising selecting a forced perspective event only if the user's viewport coincides with an inclusion zone associated with the selected forced perspective event; and in the event that one of the plurality of forced perspective events is selected, triggering the selected forced perspective event.

In an embodiment, the processor-implemented method further comprises, where one of a plurality of forced perspective events is to be triggered at the time of display of the spherical frame, selecting none or one of the plurality of forced perspective events to be triggered conditionally based at least on the orientation of the user's viewport in relation to the spherical video frames, the selecting comprising selecting a forced perspective event only if the user's viewport coincides for a threshold duration with an inclusion zone associated with the selected forced perspective event; and in the event that one of the plurality of forced perspective events is selected, triggering the selected forced perspective event.

According to another aspect, there is provided a digital media player comprising processing structure for receiving data defining a user's viewport in relation to spherical video frames displayed by the digital media player; and processing structure for, where a forced perspective event is to be triggered at the time of display of a spherical frame, triggering the forced perspective event conditionally based at least on the orientation of the user's viewport in relation to the spherical video frames.

In an embodiment, the processing structure for triggering the forced perspective event conditionally comprises processing structure for triggering the forced perspective event only if the user's viewport does not coincide with an exclusion zone associated with the spherical frame.

In an embodiment, the processing structure for triggering the forced perspective event conditionally comprises processing structure for triggering the forced perspective event only if the user's viewport does not coincide for a threshold duration with an exclusion zone associated with the spherical frame.

In an embodiment, the processing structure for triggering the forced perspective event conditionally comprises processing structure for triggering the forced perspective event only if the user's viewport coincides with an inclusion zone associated with the spherical frame.

In an embodiment, the digital media player further comprises processing structure for, where one of a plurality of forced perspective events is to be triggered at the time of display of the spherical frame, selecting none or one of the plurality of forced perspective events to be triggered conditionally based at least on the orientation of the user's viewport in relation to the spherical video frames, the selecting comprising selecting a forced perspective event only if the user's viewport coincides with an inclusion zone associated with the selected forced perspective event; and processing structure for, in the event that one of the plurality of forced perspective events is selected, triggering the selected forced perspective event.

In an embodiment, the digital media player further comprises processing structure for, where one of a plurality of forced perspective events is to be triggered at the time of display of the spherical frame, selecting none or one of the plurality of forced perspective events to be triggered conditionally based at least on the orientation of the user's viewport in relation to the spherical video frames, the selecting comprising selecting a forced perspective event only if the user's viewport coincides for a threshold duration with an inclusion zone associated with the selected forced perspective event; and processing structure for, in the event that one of the plurality of forced perspective events is selected, triggering the selected forced perspective event.

According to another aspect, there is provided a processor-readable medium embodying a computer program for a digital media player, the computer program comprising program code for receiving data defining a user's viewport in relation to spherical video frames displayed by the digital media player; and program code for, where a forced perspective event is to be triggered at the time of display of a spherical frame, triggering the forced perspective event conditionally based at least on the orientation of the user's viewport in relation to the spherical video frames.

In an embodiment, the program code for triggering the forced perspective event conditionally comprises program code for triggering the forced perspective event only if the user's viewport does not coincide with an exclusion zone associated with the spherical frame.

In an embodiment, the program code for triggering the forced perspective event conditionally comprises program code for triggering the forced perspective event only if the user's viewport does not coincide for a threshold duration with an exclusion zone associated with the spherical frame.

In an embodiment, the program code for triggering the forced perspective event conditionally comprises program code for triggering the forced perspective event only if the user's viewport coincides with an inclusion zone associated with the spherical frame.

In an embodiment, the processor-readable medium further comprises program code for, where one of a plurality of forced perspective events is to be triggered at the time of display of the spherical frame, selecting none or one of the plurality of forced perspective events to be triggered conditionally based at least on the orientation of the user's viewport in relation to the spherical video frames, the selecting comprising selecting a forced perspective event only if the user's viewport coincides with an inclusion zone associated with the selected forced perspective event; and program code for, in the event that one of the plurality of forced perspective events is selected, triggering the selected forced perspective event.

In an embodiment, the processor-readable medium further comprises program code for, where one of a plurality of forced perspective events is to be triggered at the time of display of the spherical frame, selecting none or one of the plurality of forced perspective events to be triggered conditionally based at least on the orientation of the user's viewport in relation to the spherical video frames, the selecting comprising selecting a forced perspective event only if the user's viewport coincides for a threshold duration with an inclusion zone associated with the selected forced perspective event; and program code for, in the event that one of the plurality of forced perspective events is selected, triggering the selected forced perspective event.

Systems, methods and processor-readable media disclosed herein are applicable to digital video content whether it is intended to be downloaded in its entirety, streamed, and/or is live-streamed or broadcast.

BRIEF DESCRIPTION OF THE DRAWINGS

Embodiments of the invention will now be described with reference to the appended drawings in which:

FIGS. 4A and 4B are top plan view diagrams of a sphere on which spherical video is texture mapped for display by a media player, showing an example exclusion zone and an example user viewport when conditions prevent triggering of a forced perspective event;

FIGS. 14A and 14B are top plan view diagrams of a sphere on which spherical video is texture mapped for display by a media player, showing an example inclusion zone and an example user viewport both prior to and after triggering of a forced perspective event;

DETAILED DESCRIPTION

Figure 1:
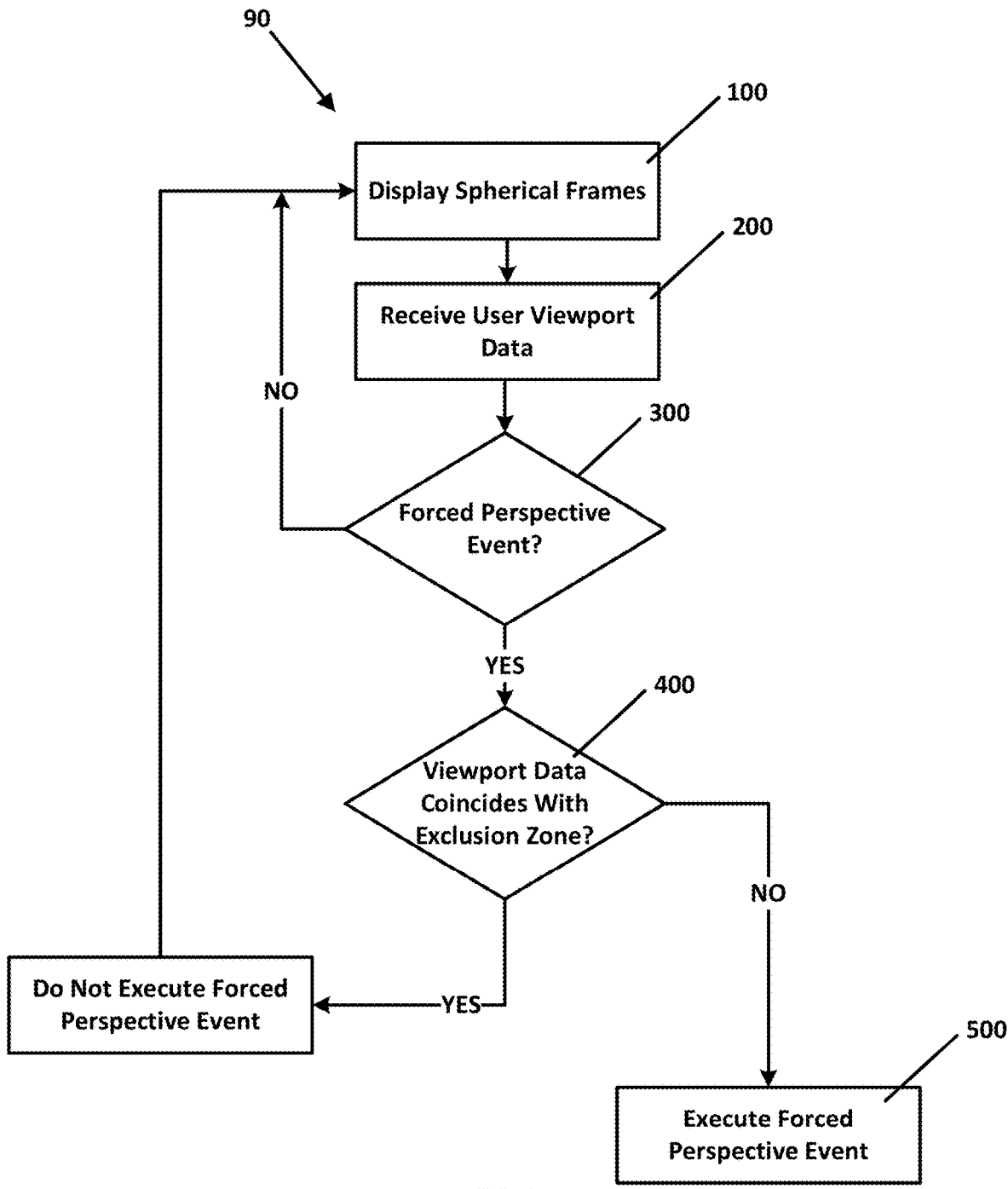
FIG. 1 is a flowchart depicting steps in a process, according to an embodiment.

FIG. 1 is a flowchart depicting steps in a process 90 for processing digital video for display on a digital media player, according to an embodiment. In this embodiment, during process 90, spherical frames of digital video are displayed (step 100) and user viewport data is received (step 200). The user viewport data is indicative of in which direction the user using the digital media player is gazing. A viewport may be thought of as the region of the spherical video that a user can see at any given moment. In this embodiment, the user viewport data includes a first angle within the range of 0 . . . 360 degrees (for a left to right reading) and a second angle within the range of 0 . . . 180 degrees (for an up to down reading). For example, a given reading of user viewport data may be (45, 90) indicating that, with respect to the spherical video frames, the centre of the user's viewport is at 45 of 360 degrees (halfway between looking forward and looking rightward) and at 90 of 180 degrees (straight horizontal, as opposed to upwards or downwards). A few seconds later, a given reading of user viewport data might, for example, be (180, 45), indicating the user has changed his/her orientation and is now looking rearward and somewhat upwards.

The frequency with which user viewport data is obtained will depend on the equipment being used by a user to view the spherical video, the implementing computing equipment for capturing the viewpoint data, and the overall needs of the system, but may be, for example, 120 readings per second. The angle of the centre of the user's orientation and the known visual field of a user (the known extent of the viewport), as well as any limitations to the viewport imposed by equipment itself such as screens, establish the user's viewport. Generally speaking, the viewport size is fixed during a playback sequence, whereas its angles are controlled by the user as the user "looks around".

In the event that a forced perspective event is to be triggered (step 300) upon display of a particular frame, it is then determined at step 400 whether the viewport data coincides with an exclusion zone that is associated with the forced perspective event.

In the event that the viewport data coincides with the exclusion zone associated with the forced perspective event (step 400), the process 90 continues without executing the forced perspective event to display spherical frames (step 100). Otherwise, the forced perspective event is executed (step 500). As such, the triggering of the forced perspective event is conditional on whether the user's viewpoint does not coincide with the exclusion zone.

During determining whether viewport data coincides with the exclusion zone, process 90 determines the extent of the exclusion zone associated with the forced perspective event, and then determines whether the angle of the user's viewport coincides with a location within the exclusion zone. This may be done by creating a ray from the user's location in the middle of the sphere (0,0,0) along a trajectory passing from this location at angles corresponding to the user viewport data. In the event that the exclusion zone is defined as a patch (i.e. a region) of the sphere, viewport data coincides with the exclusion zone if the ray intersects the patch. In the event that the exclusion zone is defined as a pane extending between points on the sphere (or a pane simply defined anywhere between the user's location at the middle of the sphere and the outer boundary of the sphere, rather than the pane having necessarily to contact the outer boundary of the sphere), viewport data coincides with the exclusion zone if the ray intersects the pane. It will be understood that various ways of defining an exclusion zone, and for determining whether viewport data coincides with the exclusion zone, are possible. For example, in the event that the exclusion zone is defined as a pane as explained above, process 90 may first project the pane onto the sphere as a patch and determine at the time of the forced perspective event whether the ray intersects that patch. As another example, in the event that the exclusion zone is defined as a patch as explained above, process 90 may first translate the patch into a pane and determine at the time of the forced perspective event whether the ray intersects the pane. Alternatives are possible.

It will be noted that a given forced perspective event may not be associated with an exclusion zone. In such an event, there will be no condition placed on the triggering of the forced perspective event that relates to the orientation of the user's viewport. Other conditions may be placed on the triggering of the forced perspective event.

Figure 2A:
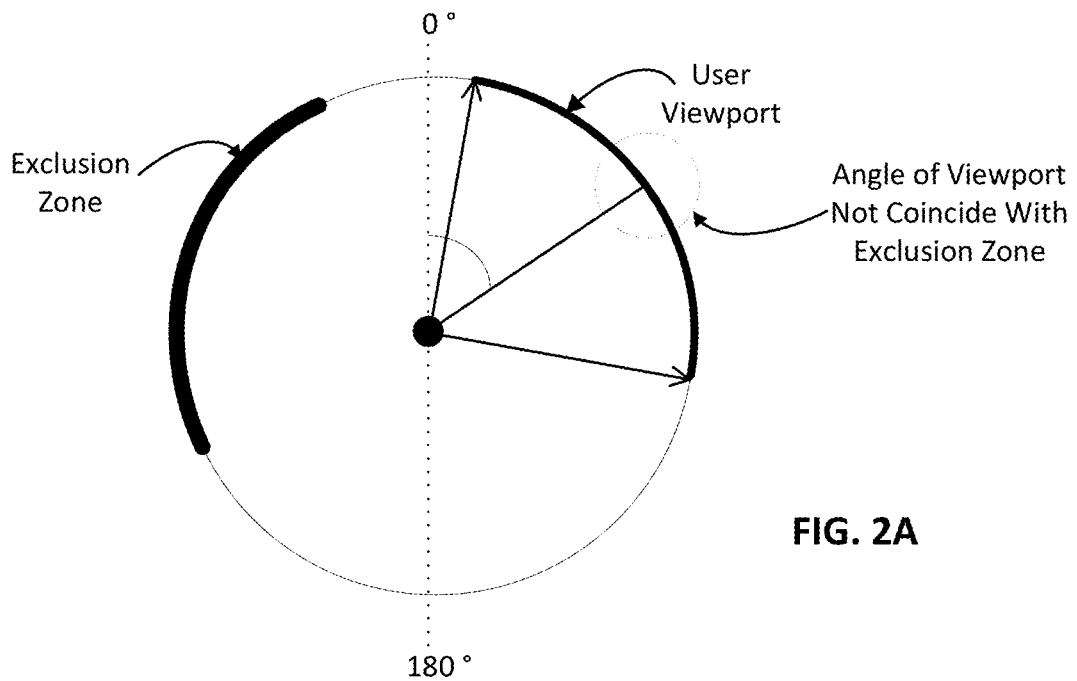
FIGS. 2A and 2B are top plan view diagrams of a sphere on which spherical video is texture mapped for display by a media player, showing an example exclusion zone and an example user viewport both prior to and after triggering of a forced perspective event.
Figure 2B:
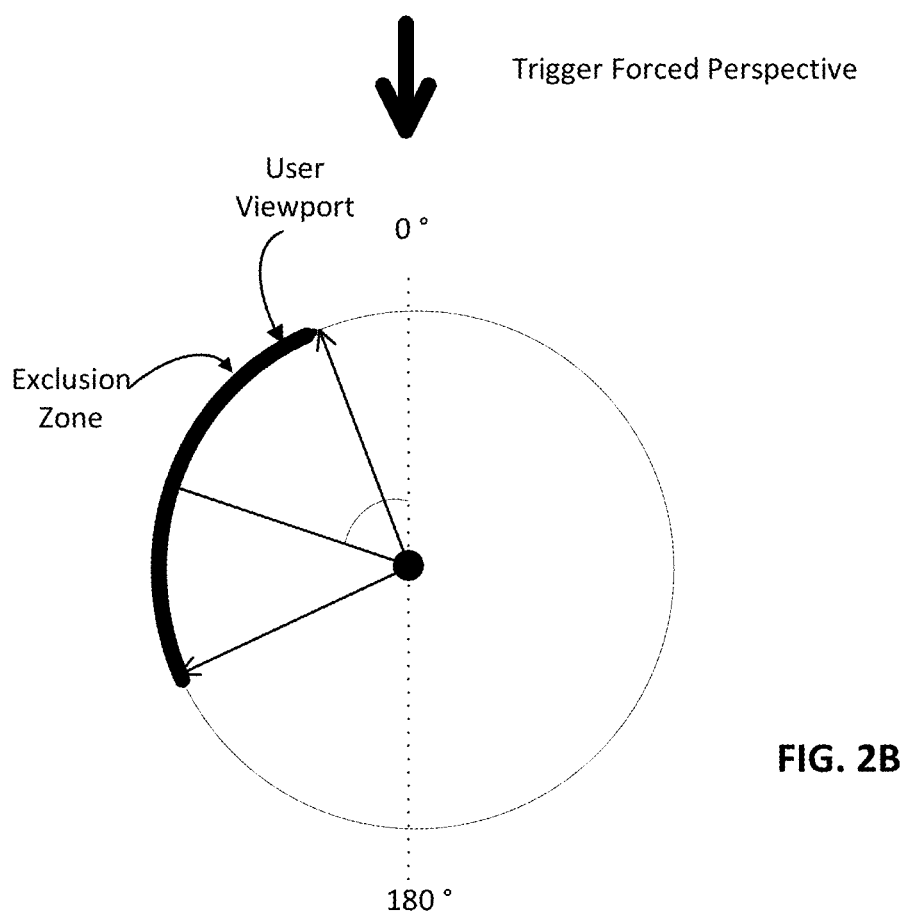

FIGS. 2A and 2B are top plan view diagrams of a sphere on which spherical video is texture mapped for display by a media player, with an example user viewport viewing angle not coinciding with an exclusion zone at the time of a forced perspective event such that the forced perspective event is triggered, the exclusion zone being defined as a patch on the sphere. The forced perspective event is triggered because the angle of the viewport does not coincide with (extend into, intersect etc.) the exclusion zone.

In FIGS. 2A and 2B and similar figures set out below, the relative sizes of the exclusion zone and the user's viewport are not to scale and are so illustrated simply for ease of understanding. For example, an exclusion zone may be defined to be a small fraction of the size of a viewport, or an exclusion zone may be defined to be larger than the size of the viewport, depending on the requirements of the author/editor. Furthermore, while in this embodiment the angle to which perspective is to be forced corresponds to the middle of the exclusion zone, alternatives may be made available to an author/editor whereby the angle to which perspective is to be forced does not correspond to the middle of the exclusion zone.

Figure 3A:
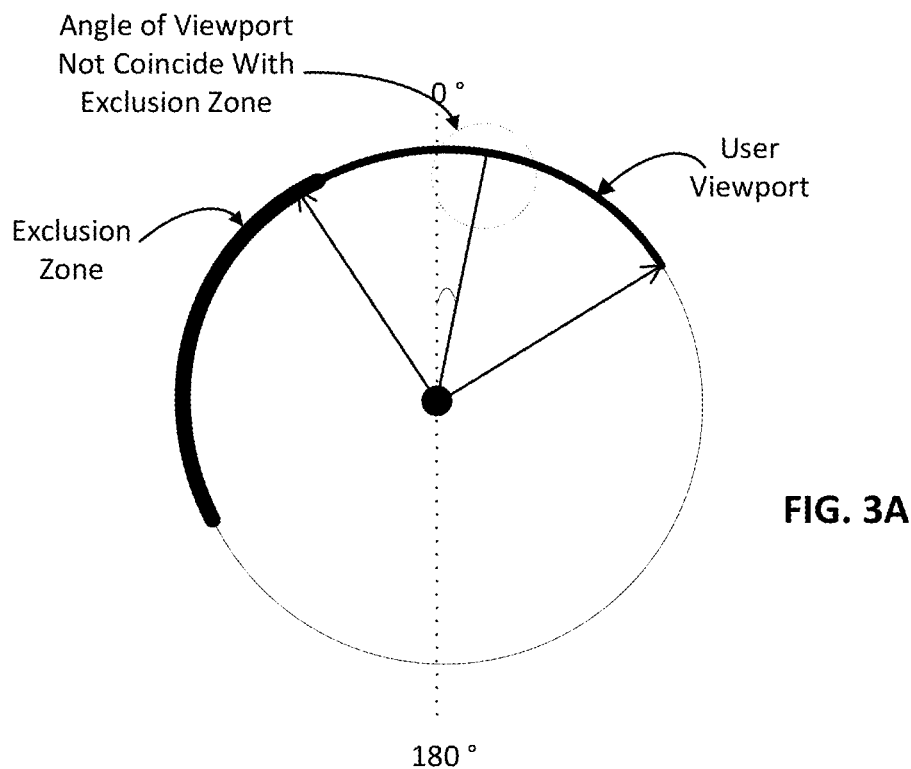
FIGS. 3A and 3B are top plan view diagrams of a sphere on which spherical video is texture mapped for display by a media player, showing an example exclusion zone and an example user viewport both prior to and after triggering of a forced perspective event.
Figure 3B:
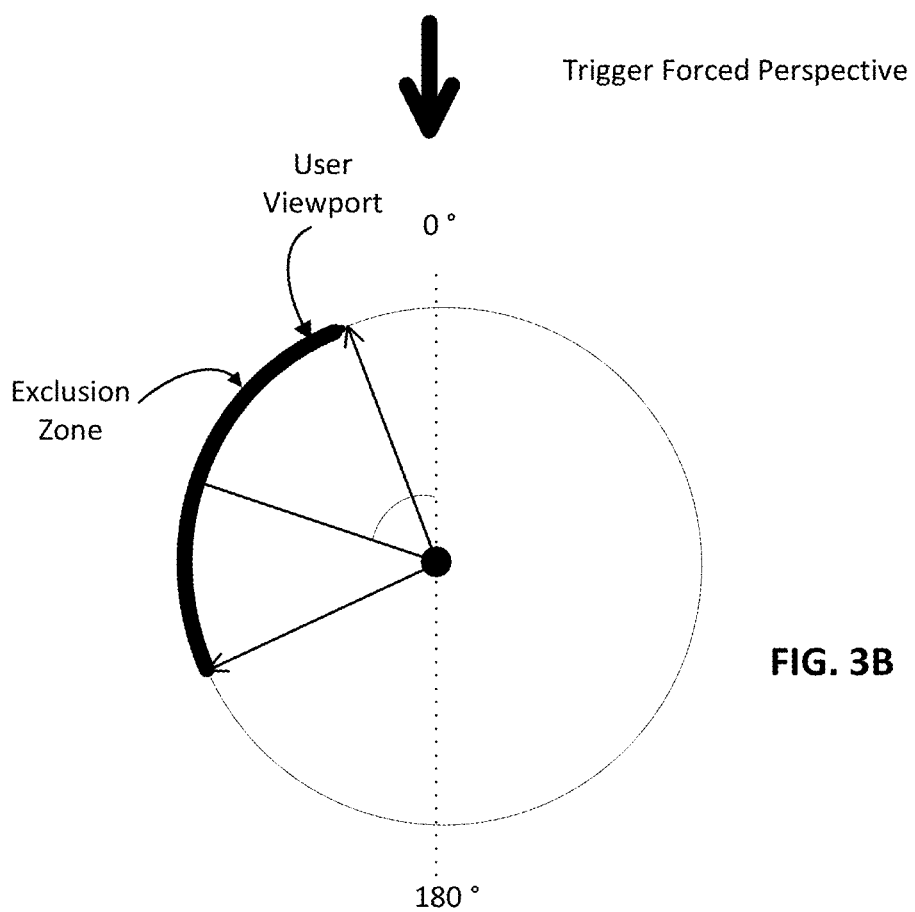

FIGS. 3A and 3B are top plan view diagrams of a sphere on which spherical video is texture mapped for display by a media player, with another example user viewport viewing angle not coinciding with an exclusion zone at the time of a forced perspective event such that the forced perspective event is executed, the exclusion zone being defined as a patch on the sphere. While there is overlap of the exclusion zone and the user's viewport, in this embodiment the viewport is not considered to coincide because the centre of the viewport does not coincide with the exclusion zone. That is, the forced perspective event is triggered because the angle of the viewport does not coincide with (extend into, intersect etc.) the exclusion zone.

FIGS. 4A and 4B are top plan view diagrams of a sphere on which spherical video is texture mapped for display by a media player, with another example user viewport viewing angle coinciding with an exclusion zone at the time of a forced perspective event such that the forced perspective event is not triggered, the exclusion zone being defined as a patch on the sphere. The forced perspective event is not triggered because the angle of the viewport coincides with the exclusion zone. In this case, a ray extending from the user at (0,0,0) along the viewport angle intersects the patch defining the exclusion zone.

Figure 5:
FIG. 5 is a screenshot of an authoring/editing screen where an exclusion zone for a forced perspective event is being defined in association with a frame as a patch on a sphere to which the spherical video frame will be texture mapped.

FIG. 5 is a screenshot of an authoring/editing screen where an exclusion zone for a forced perspective event is being defined in association with a frame as a patch on a sphere to which the spherical video frame will be texture mapped. In this embodiment, the author/editor can establish the exclusion zone as a hit box for which "hits" execute no events, thereby overriding execution of a forced perspective event that is also associated with this frame. More particularly, the hit box is associated with a particular frame, specified by degrees of orientation (H Rot, V Rot) and a width and a height. The hit box (in this example, Hitbox 29) is associated with an In Frame 13694 and an Out frame 14450 (thus having a duration of 756 frames), which provides that the hit box will, as frames 13694 to 14450 are being displayed, cause any forced perspective events associated with the frames not to be executed should the user's (the eventual viewer of the video) gaze coincide with the hit box.

Figure 6A:
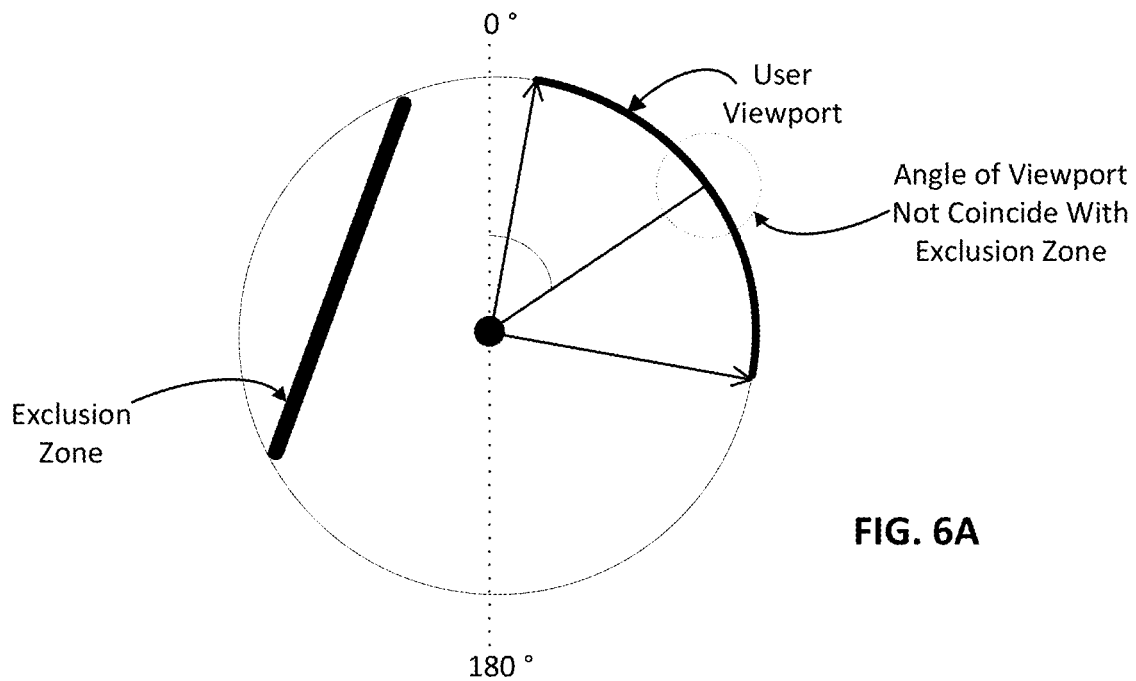
FIGS. 6A and 6B are top plan view diagrams of a sphere on which spherical video is texture mapped for display by a media player, showing another example exclusion zone and an example user viewport both prior to and after triggering of a forced perspective event.
Figure 6B:
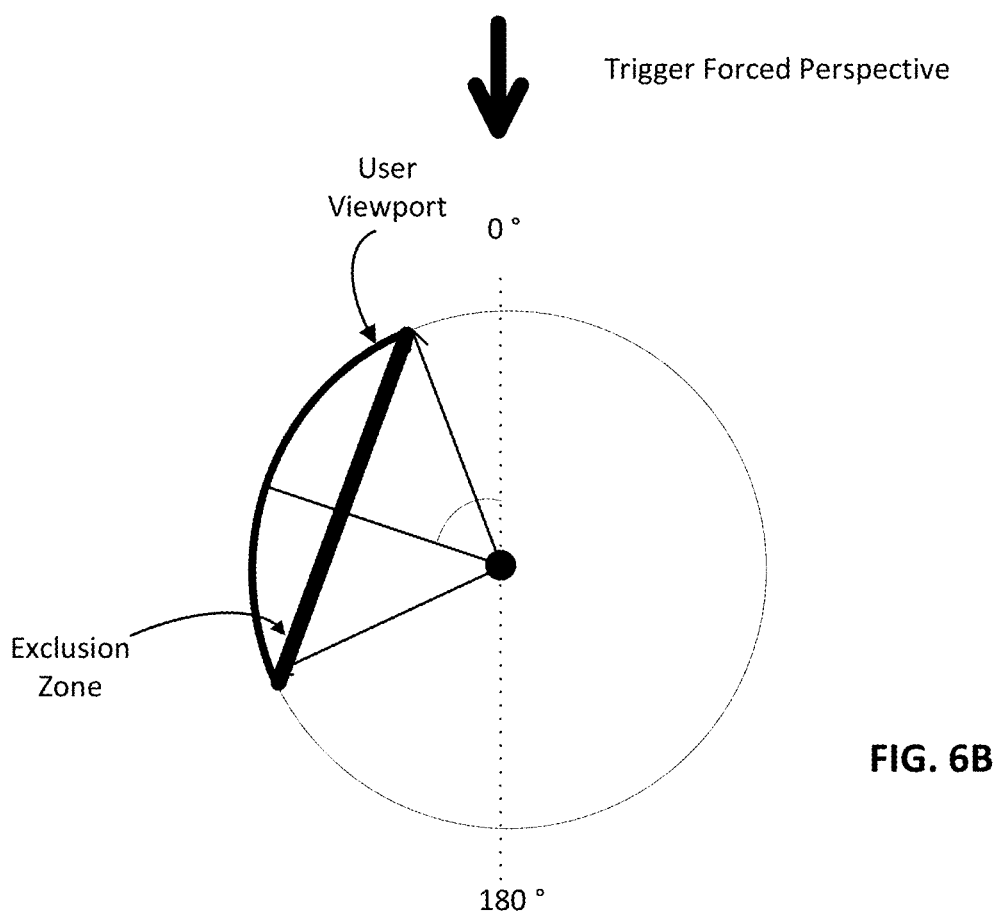

FIGS. 6A and 6B are top plan view diagrams of a sphere on which spherical video is texture mapped for display by a media player, with an example user viewport viewing angle not coinciding with an exclusion zone at the time of a forced perspective event such that the forced perspective event is triggered, the exclusion zone being defined as a pane. The forced perspective event is triggered because the angle of the viewport does not coincide with (extend into, intersect etc.) the exclusion zone.

Figure 7A:
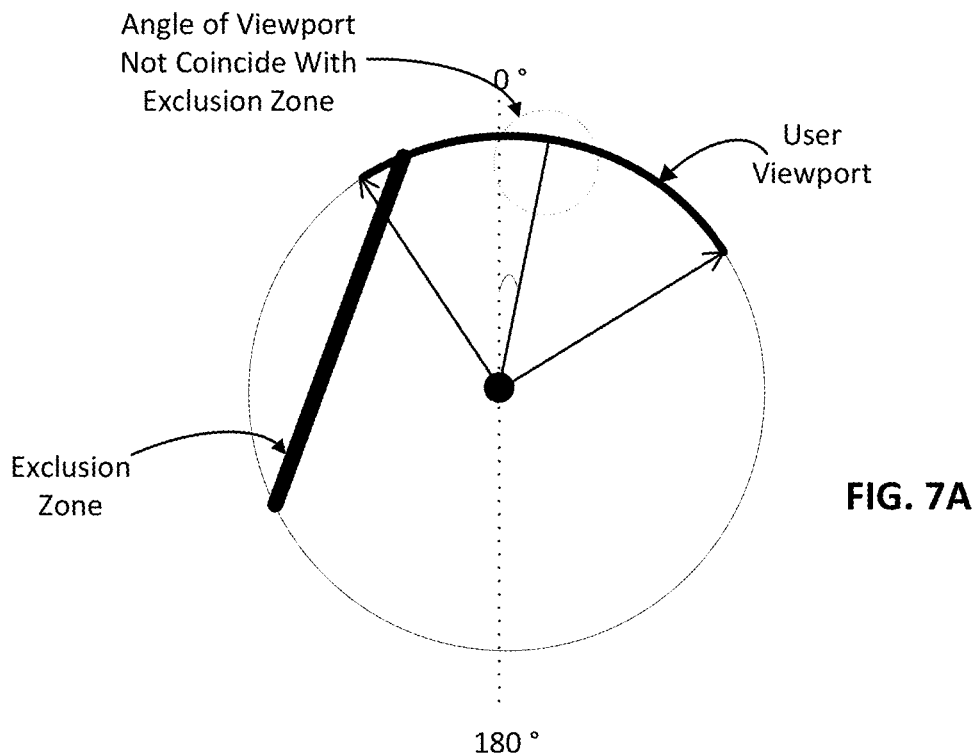
FIGS. 7A and 7B are top plan view diagrams of a sphere on which spherical video is texture mapped for display by a media player, showing another example exclusion zone and an example user viewport both prior to and after triggering of a forced perspective event.
Figure 7B:
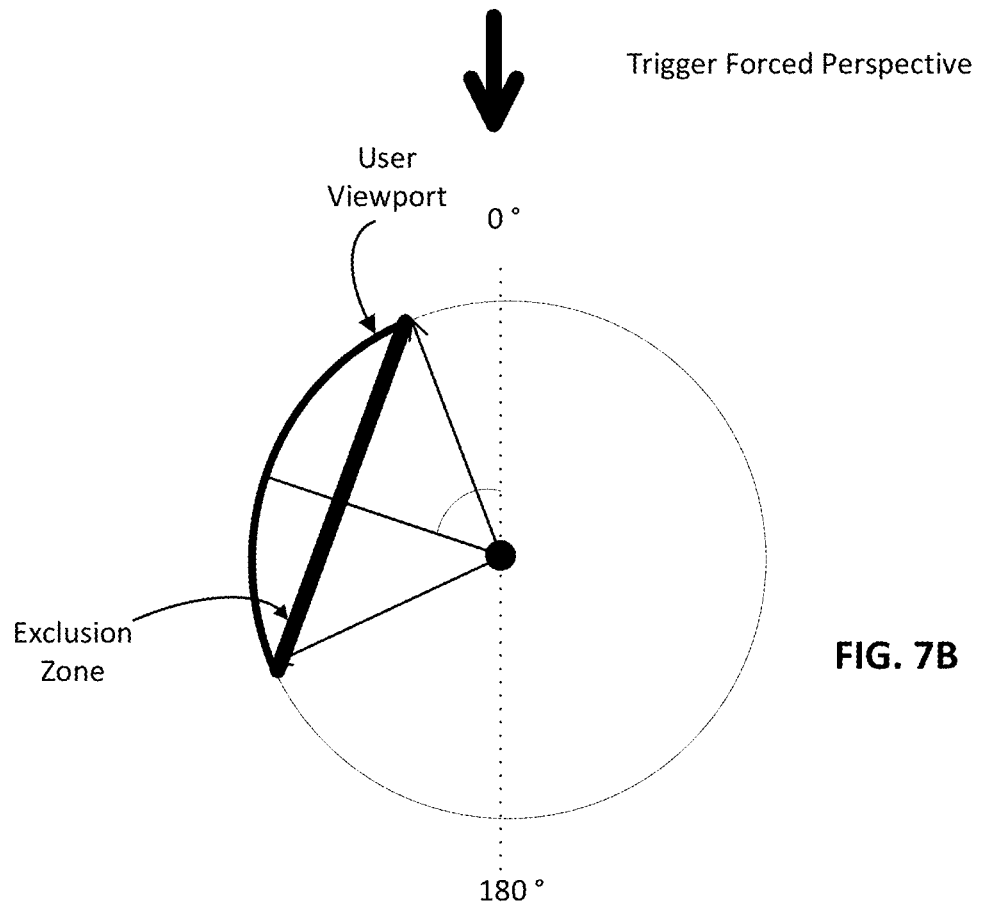

FIGS. 7A and 7B are top plan view diagrams of a sphere on which spherical video is texture mapped for display by a media player, with another example user viewport viewing angle not coinciding with an exclusion zone at the time of a forced perspective event such that the forced perspective event is triggered, the exclusion zone being defined as a pane. While there is overlap of the exclusion zone and the user's viewport, in this embodiment the viewport is not considered to coincide because the centre of the viewport does not coincide with the exclusion zone. That is, the forced perspective event is triggered because the angle of the viewport does not coincide with (extend into, intersect etc.) the exclusion zone.

Figure 8A:
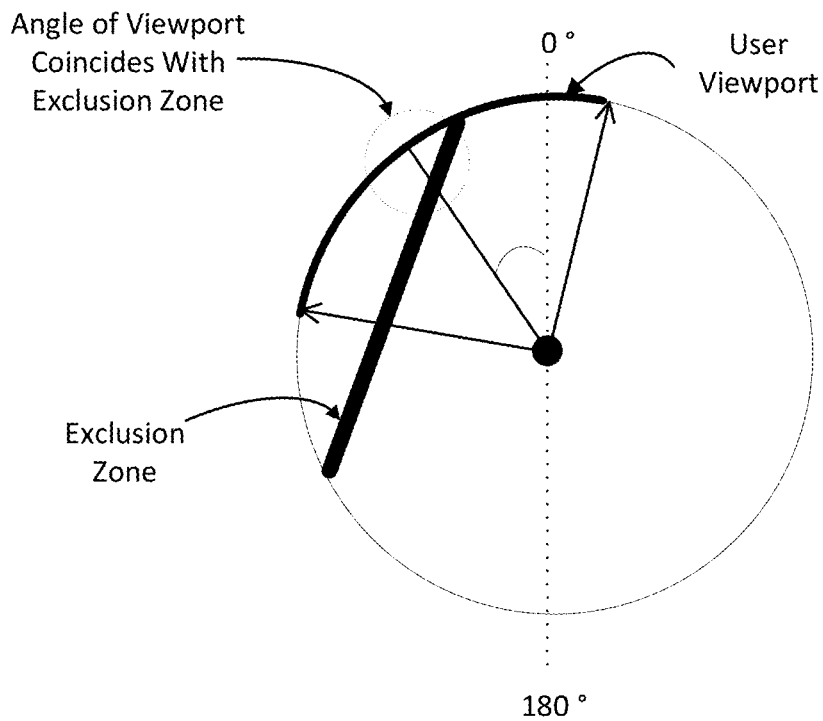
FIGS. 8A and 8B are top plan view diagrams of a sphere on which spherical video is texture mapped for display by a media player, showing another example exclusion zone and an example user viewport when conditions prevent triggering of a forced perspective event.
Figure 8B:
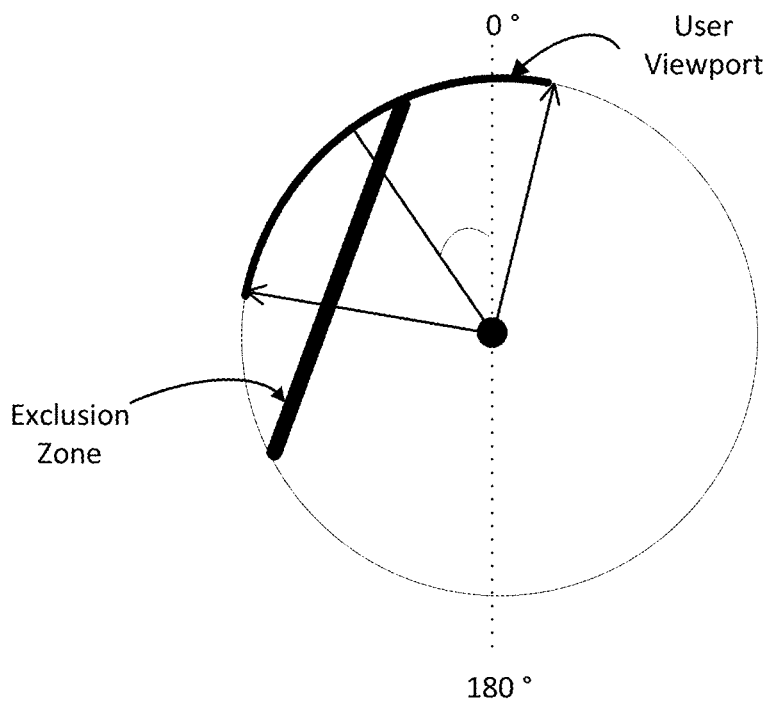

FIGS. 8A and 8B are top plan view diagrams of a sphere on which spherical video is texture mapped for display by a media player, with another example user viewport viewing angle coinciding with an exclusion zone at the time of a forced perspective event such that the forced perspective event is not triggered, the exclusion zone being defined as a pane. The forced perspective event is not triggered because the angle of the viewport coincides with the exclusion zone. In this case, a ray extending from the user at (0,0,0) along the viewport angle intersects the pane defining the exclusion zone.

Figure 9:
FIG. 9 is a screenshot of an authoring/editing screen where an exclusion zone for a forced perspective event is being defined in association with a frame as a pane extending between points on a sphere to which the spherical video frame will be texture mapped.
Figure 10:
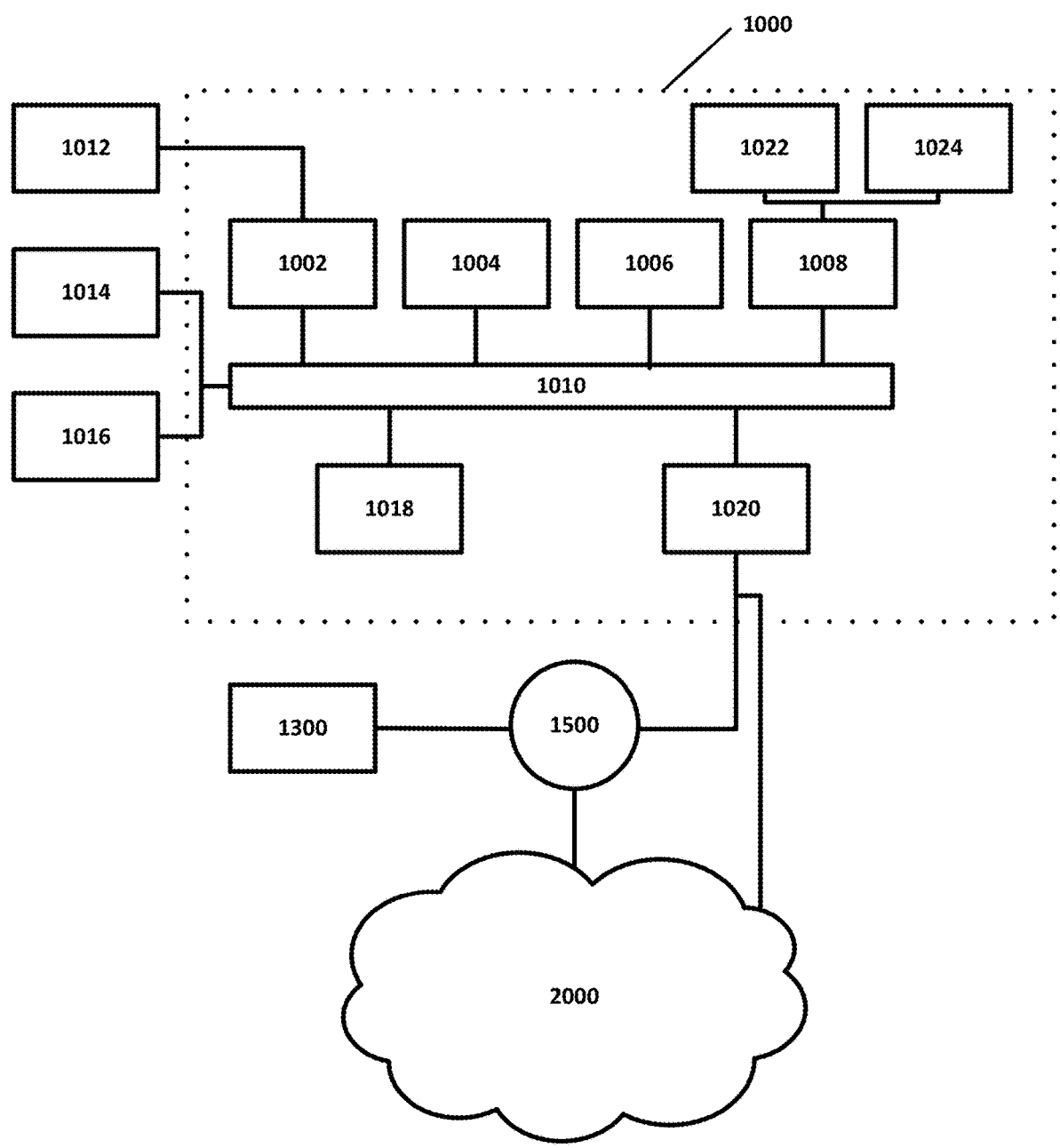
FIG. 10 is a schematic diagram of a computing system according to an embodiment.

FIG. 9 is a screenshot of an authoring/editing screen where an exclusion zone for a forced perspective event is being defined in association with a frame as a pane extending between points on a sphere to which the spherical video frame will be texture mapped. In this embodiment, the author/editor can establish the exclusion zone as a hit box for which "hits" execute no events, thereby overriding execution of a forced perspective event that is also associated with this frame. More particularly, the hit box is associated with a particular frame, specified by degrees of orientation (H Rot, V Rot) and a width and a height. The hit box (in this example, Hitbox 29) is associated with an In Frame 13694 and an Out frame 14450 (thus having a duration of 756 frames), which provides that the hit box will, as frames 13694 to 14450 are being displayed, cause any forced perspective events associated with the frames not to be executed should the user's (the eventual viewer of the video) gaze coincide with the hit box.

In this embodiment, process 90 is executed on one or more systems such as special purpose computing system 1000 shown in FIG. 2. Computing system 1000 may also be specially configured with software applications and hardware components to enable a user to play media such as digital video, as well as to decode and/or transcode the digital video from and into various formats such as MP4, AVI, MOV, WEBM and using a selected compression algorithm such as H.264 or H.265 and according to various selected parameters, thereby to view the digital video as desired for a particular application, media player, or platform.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

The computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

The computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computing system 1000 also includes a display controller 1002 coupled to the bus 1010 to control a display 1012, such as an LED (light emitting diode) screen, organic LED (OLED) screen, liquid crystal display (LCD) screen or some other device suitable for displaying information to a computer user. In this embodiment, display controller 1002 incorporates a dedicated graphics processing unit (GPU) for processing mainly graphics-intensive or other highly-parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application programming interface (API) such as OpenGL, Direct3D and the like.

The computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

The computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry may be used in place of or in combination with software instructions.

As stated above, the computing system 1000 includes at least one processor readable medium or memory for holding instructions programmed according to the teachings of the invention and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, includes software for controlling the computing system 1000, for driving a device or devices to perform the functions discussed herein, and for enabling the computing system 1000 to interact with a human user (e.g., digital video author/editor). Such software may include, but is not limited to, device drivers, operating systems, development tools, and applications software. Such processor readable media further includes the computer program product for performing all or a portion (if processing is distributed) of the processing performed discussed herein.

The computer code devices of discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

The computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Computing system 1000 may be provisioned with or be in communication with live broadcast/streaming equipment that receives, in near real-time, a stream of digital video content captured in near real-time from a particular live event and associated with forced perspective events and corresponding exclusion zones.

The electronic data store implemented in the database described herein may be one or more of a table, an array, a database, a structured data file, an XML file, or some other functional data store, such as hard disk 1022 or removable media 1024.

A particular device appropriate for playback of a given digital video may take any of a number of forms. For example, the media player computing system may process the digital video for playback using a central processing unit (CPU) or both a CPU and a GPU, if appropriately equipped, or may be a hardware-based decoder. A media player computing system including a GPU would preferably support an abstracted application programming interface such as OpenGL for use by a media player application running on the computing system to instruct the graphics processing unit of the media player computing system to conduct various graphics-intensive or otherwise highly-parallel operations. The media player may take the form of a desktop or laptop computer, a smartphone, virtual reality headgear, or some other suitably provisioned and configured computing device.

Various forms of computing system could be employed to play back video content in particular, such as head mounted displays, augmented reality devices, holographic displays, input/display devices that can interpret hand and face gestures using machine vision as well as head movements through various sensors, devices that can react to voice commands and those that provide haptic feedback, surround sound audio and/or are wearables. Such devices may be capable of eye-tracking and of detecting and receiving neural signals that register brain waves, and/or other biometric signals as inputs that can be used to control visual and aural representations of video content based on the selected viewport.

An XML or JSON metadata file containing events to be triggered by the media player and other playback control data is made available for download in association with the encoded digital video file. In order to play back the digital video as well as to trigger the events, the media player processes the digital video file thereby to reconstruct the compressed frames of digital video and store the frames in video memory of the media player for further processing.

Thereafter, the 360 video frames are texture-mapped by the media player to the predetermined spherical mesh and the texture-mapped frame is inserted into the frame buffer RAM as a bitmap for display by the display device of the media player.

Events, such as forced perspective events, associated with an event-triggering frame are triggered by the media player as the event-triggering frame is placed into the frame buffer. Elements such as graphical overlays that are triggered to be rendered by certain events are rendered in real-time and in sync with the digital video frames with which the events are associated.

As for a computing device for displaying user interfaces (such as those shown in FIGS. 5 and 9) for permitting an author/editor to insert forced perspective events and define exclusion zones as described above, a computing device having various capabilities in addition to those described above in connection with computing device 1000 may be employed. Such a computing system may similarly be specially configured with software applications and hardware components to enable a user to play media such as digital video, as well as to decode and/or transcode the digital video from and into various formats such as MP4, AVI, MOV, WEBM and using a selected compression algorithm such as H.264 or H.265 and according to various selected parameters, thereby to view the digital video as desired for a particular application, media player, or platform.

A user working on a particular composition—an author/editor—may insert various events including forced perspective events into the workflow using a user interface of authoring/editing software tools, and may define an exclusion zone (or multiple exclusion zones) in connection with the forced perspective event that is associated with a particular frame. This may be done at any time, most usefully during editing in order to preview the effect of events that are being associated with particular frames. An exclusion zone can be as small or as large as an author/editor wishes, and once established in the user interface may be joined with other parameters of the forced perspective event in terms of coordinates defining the bounds of the exclusion zone, and the type (such as patch or pane, as described above). In an embodiment, an exclusion zone can be a shape other than a rectangle or square, such as a circle or an oval. In an embodiment, upon an author/editor creating a forced perspective event, the software tool may automatically define an exclusion zone for the forced perspective event, having a default angle (centred, for example, on the frame with which the forced perspective event is being associated), size and type (i.e., patch or pane) that the author/editor can then adjust or even delete as the author/editor sees fit. Such an automatic definition of the exclusion zone may be useful for author/editors who are new to the spherical medium, but such automatic definition may be a setting in the authoring/editing environment that can be toggled off by more experienced users who do not need or want such default exclusion zones to be automatically defined at all.

The metadata file or a derivative of it is meant to accompany the digital video file when downloaded or streamed to a media player for playback, or may be located on the platform hardware hosting the media player. When accompanying the video file it could be included as part of a header of a video file. However, this approach would require re-rendering the video file in order to make modifications to the metadata and, where additional assets were required during event-triggering, such assets would have also to be tightly integrated in some way. Alternatively, when accompanying the video file the metadata file could simply have the same filename and path as the video file, with a different file extension, such that the media player could easily find and handle the two files in cooperation with each other. In this embodiment, the metadata file is downloaded to the media player, parsed and represented in system memory as one or more events, including one or more forced perspective events with respective exclusion zones, associated with a frame identifier that is/are to be triggered upon display of the decoded frame from which the corresponding frame identifier has been parsed. Such a frame may be referred to as an event-triggering frame, and there may be many such event-triggering frames corresponding to one or more respective events to be executed by the media player.

Although embodiments have been described with reference to the drawings, those of skill in the art will appreciate that variations and modifications may be made without departing from the spirit, scope and purpose of the invention as defined by the appended claims.

While, in embodiments described herein, a viewport was not considered to coincide with an exclusion zone in the event that its centre did not coincide with the exclusion zone, alternatives are possible. For example, implementations may register a viewport coinciding with an exclusion zone in the event that there was any overlap, a particular amount of overlap, or some other criterion. This may depend on the requirements of the author/editor, the relative sizes of the viewport and the exclusion zone, and other factors.

The principles described above are applicable to modifying whether a forced perspective event is triggered based on a condition related to in which direction a user is gazing at the time the forced perspective event is to be triggered. While the concepts relating to an exclusion zone or zones have been described above, it is similarly possible to define an inclusion zone or zones. An inclusion zone is similar to an exclusion zone, except that the associated forced perspective event is executed to orient the user's viewport to anywhere in the sphere the author/editor wishes only if the user is gazing at one of potentially multiple inclusion zones at the relevant time, and is otherwise not executed. In embodiments described above, a single inclusion zone is effectively defined as the remainder of the spherical video frames not coinciding with the defined exclusion zone patch or pane. However, in alternative embodiments each inclusion zone could be specifically defined as a respective patch or pane such that the remainder of the spherical video frames area not covered by an inclusion zone would operate, effectively, as an exclusion zone. In such a case, determining whether a user's viewport coincides with the exclusion zone could involve determining whether the ray extending from the user's position (0,0,0) at the viewport angle would miss all such patches or panes. Other methods of automatically making this determination may be employed.

Figure 11:
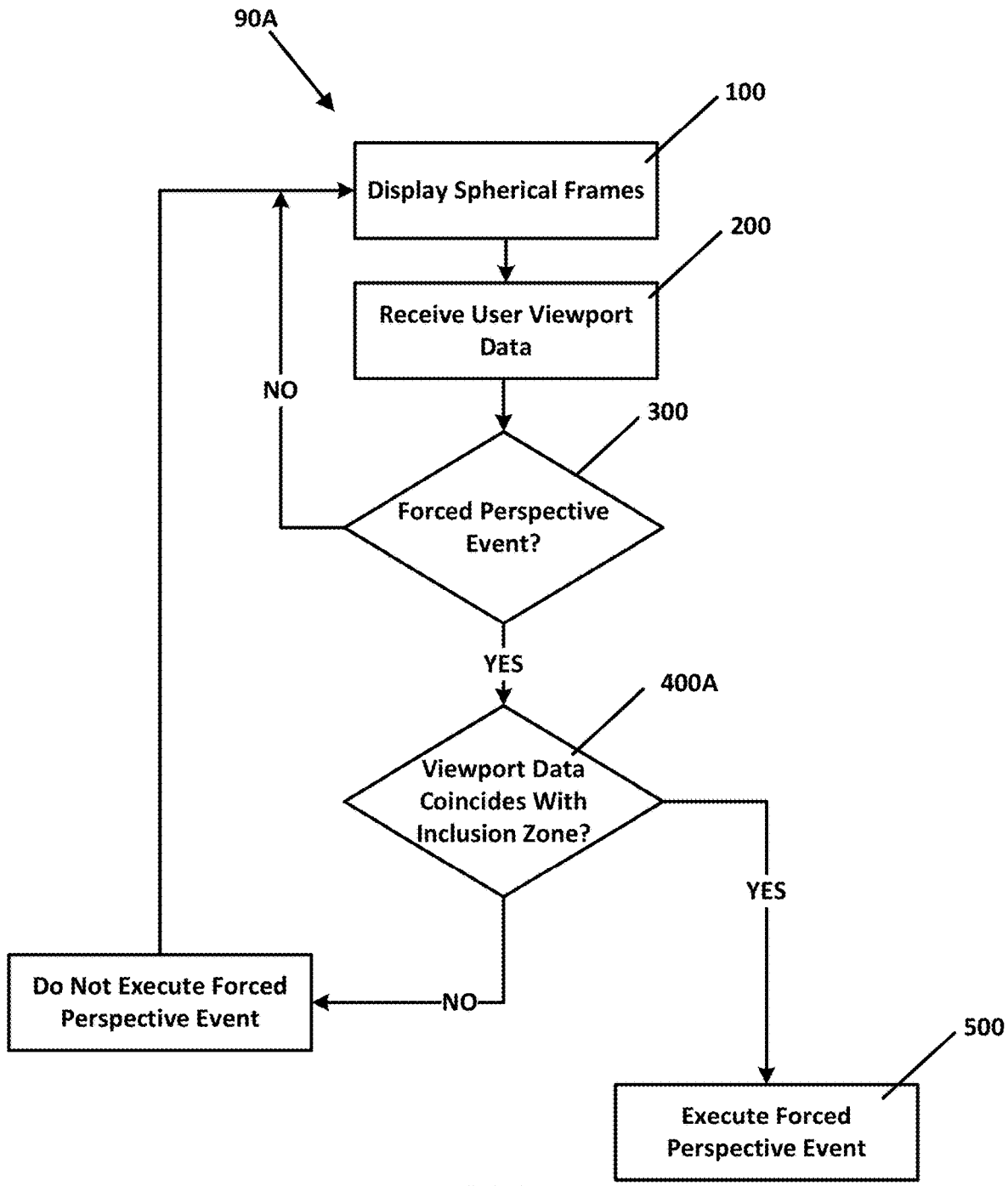
FIG. 11 is a flowchart depicting steps in a process, according to an embodiment.

FIG. 11 is a flowchart depicting steps in a process 90A for processing digital video for display on a digital media player, according to an alternative embodiment. Process 90A is similar to process 90 described above, with the exception that an inclusion zone is defined in association with a forced perspective event such that process 90A triggers the forced perspective event only if the user's viewport coincides with the inclusion zone. As such, in this embodiment, during process 90A, spherical frames of digital video are displayed (step 100) and user viewport data is received (step 200). In the event that a forced perspective event is to be triggered (step 300) upon display of a particular frame, it is then determined at step 400A whether the viewport data coincides with an inclusion zone that is associated with the forced perspective event. In the event that the viewport data does not coincide with the inclusion zone associated with the forced perspective event (step 400A), the process 90A continues without executing the forced perspective event to display spherical frames (step 100). Otherwise, the forced perspective event is executed (step 500). As such, the triggering of the forced perspective event is conditional on whether the user's viewpoint coincides with the inclusion zone.

Figure 12A:
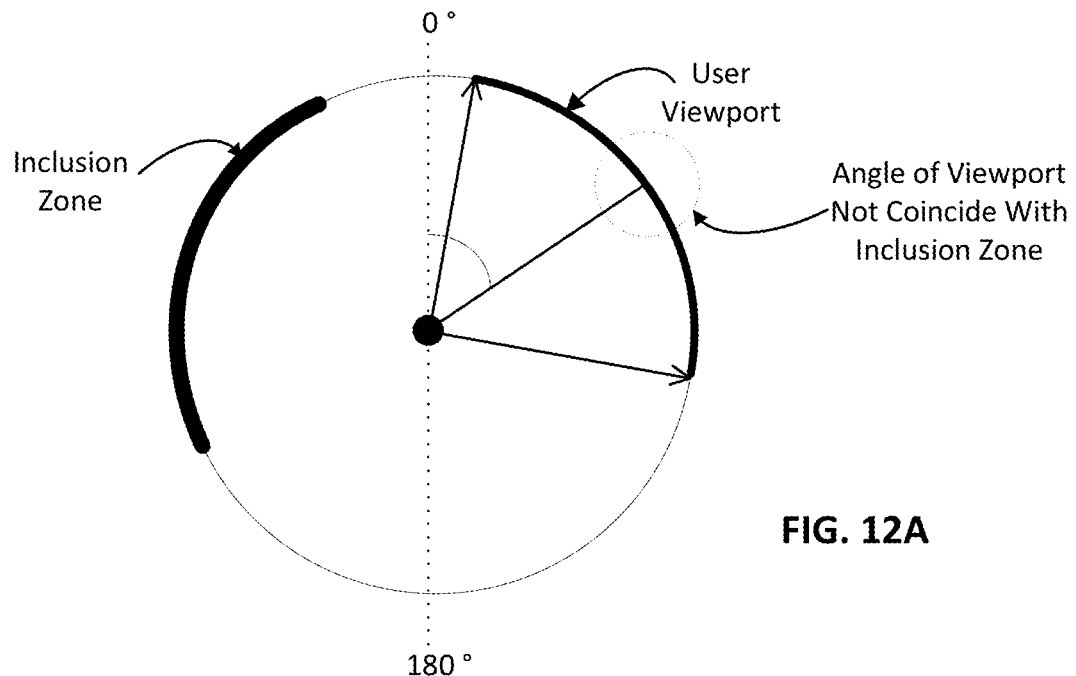
FIGS. 12A and 12B are top plan view diagrams of a sphere on which spherical video is texture mapped for display by a media player, showing an example inclusion zone and an example user viewport when conditions prevent triggering of a forced perspective event.
Figure 12B:
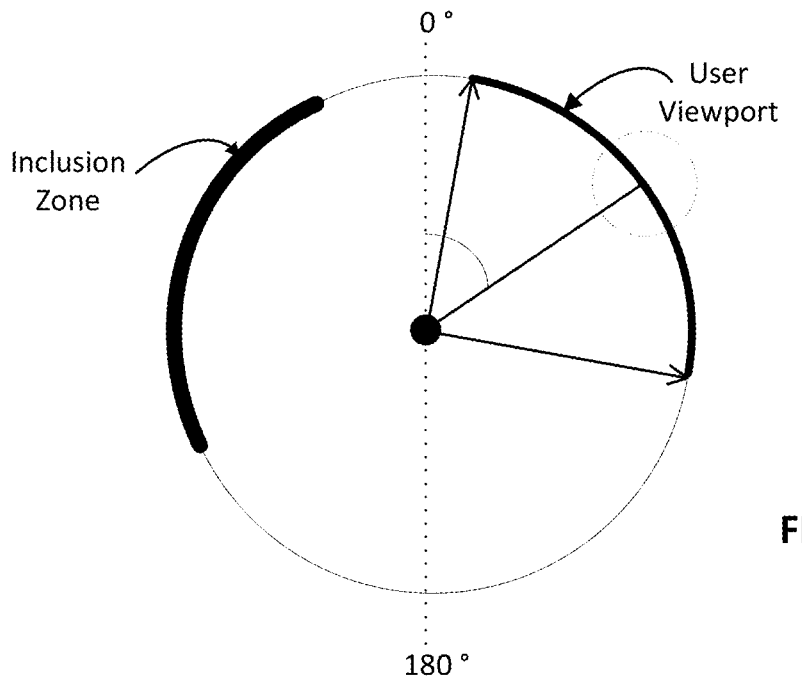

FIGS. 12A and 12B are top plan view diagrams of a sphere on which spherical video is texture mapped for display by a media player, showing an example inclusion zone and an example user viewport when conditions prevent triggering of a forced perspective event. In this case, the viewport viewing angle does not coincide with the inclusion zone at the time of a forced perspective event such that the forced perspective event is not triggered. The forced perspective event is not triggered because the angle of the viewport does not coincide with (extend into, intersect etc.) the inclusion zone.

In FIGS. 12A and 12B and similar figures set out below, the relative sizes of the inclusion zone(s) and the user's viewport are not to scale and are so illustrated simply for ease of understanding. For example, an inclusion zone may be defined to be a small fraction of the size of a viewport, or an inclusion zone may be defined to be larger than the size of the viewport, depending on the requirements of the author/editor.

Figure 13A:
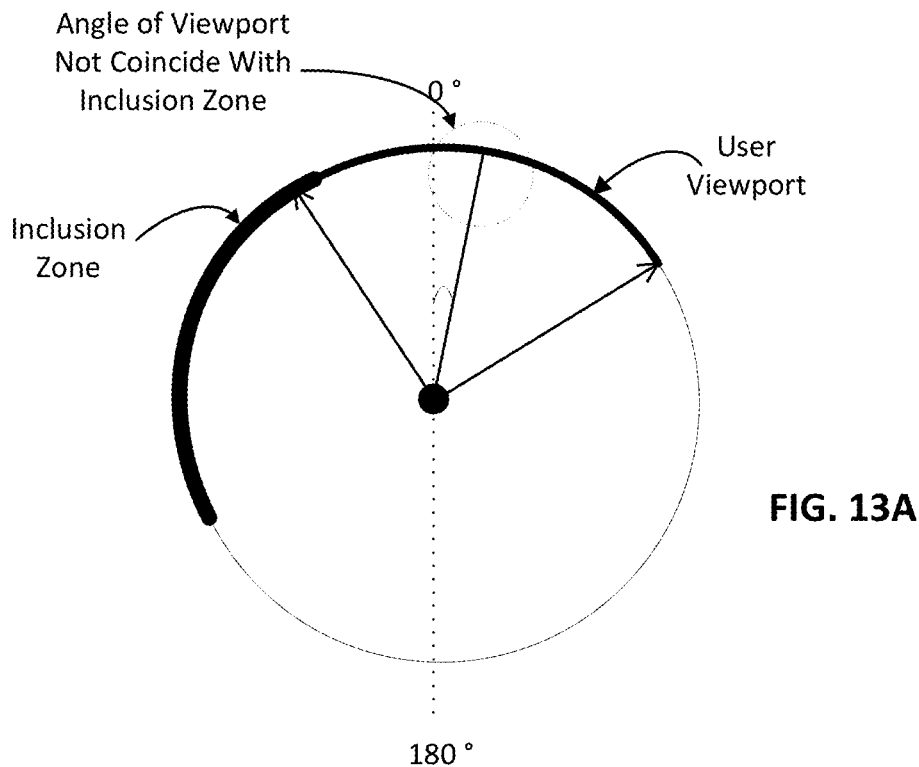
FIGS. 13A and 13B are top plan view diagrams of a sphere on which spherical video is texture mapped for display by a media player, showing an example inclusion zone and an example user viewport when conditions prevent triggering of a forced perspective event.
Figure 13B:
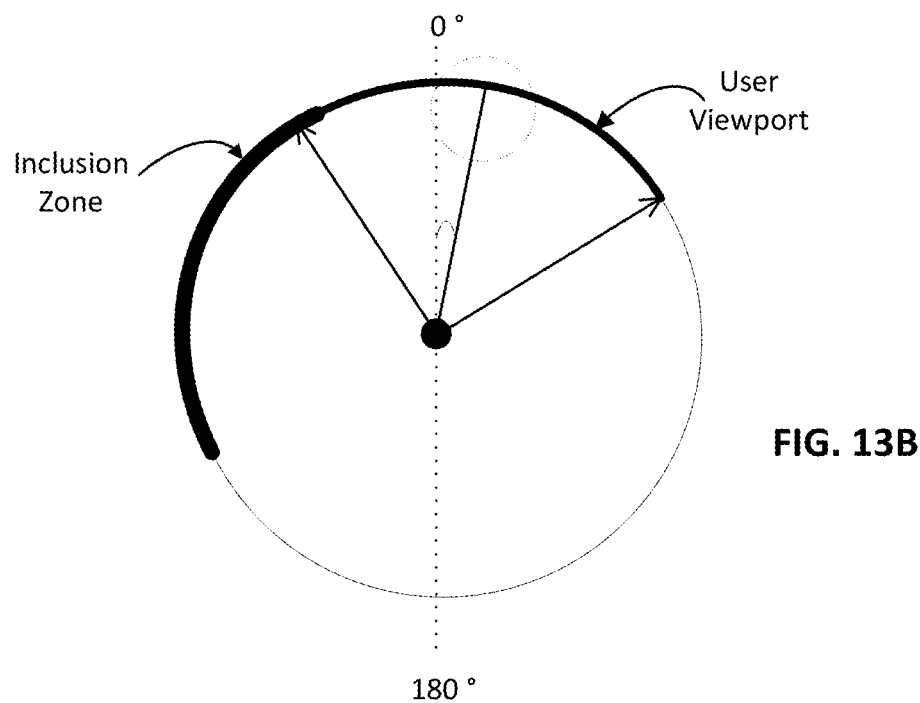

FIGS. 13A and 13B are top plan view diagrams of a sphere on which spherical video is texture mapped for display by a media player, showing an example inclusion zone and an example user viewport when conditions prevent triggering of a forced perspective event. In this case, the viewport viewing angle does not coincide with the inclusion zone at the time of a forced perspective event such that the forced perspective event is not triggered. The forced perspective event is not triggered because the angle of the viewport does not coincide with (extend into, intersect etc.) the inclusion zone.

FIGS. 14A and 14B are top plan view diagrams of a sphere on which spherical video is texture mapped for display by a media player, showing an example inclusion zone and an example user viewport both prior to and after triggering of a forced perspective event. It can be seen that the angle to which perspective is to be forced does not correspond to the inclusion zone, in this example. An author/editor may wish for the angle to which perspective is to be forced to correspond in some way to the inclusion zone in order to induce a jump cut, for example, but may use this mechanism in order to direct the user's attention when gazing in a particular direction (the inclusion zone) to a particular other direction (some particular direction away from the inclusion zone).

Figure 15:
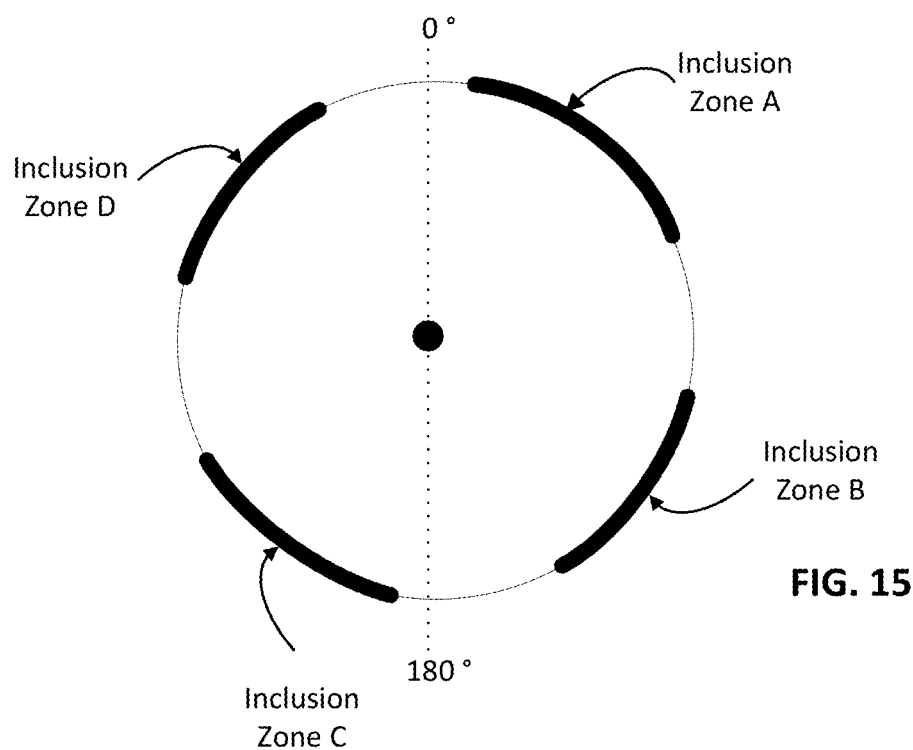
FIG. 15 is a top plan view diagram of a sphere on which spherical video is texture mapped for display by a media player, showing multiple example inclusion zones A, B, C and D, each associated with a respective forced perspective event.

FIG. 15 is a top plan view diagram of a sphere on which spherical video is texture mapped for display by a media player, showing multiple example inclusion zones A, B, C and D, each associated with a respective forced perspective event. This arrangement provides for a "set" of exclusion zones established by the author/editor in order to trigger different forced perspective events based on in which direction the user is gazing at the time the associated frame (or sequence of frames) is to be displayed. As such, a given frame (or sequence of frames) can be associated by the author/editor with multiple forced perspective events, each of which are associated with a respective different inclusion zone. For example, if a user watching a scene has chosen to orient his or her viewport to coincide with inclusion zone A in order to watch character A while character A engages in an argument with character B, then a forced perspective event associated with a particular frame showing the argument and with inclusion zone A can be triggered at the given time to automatically orient the user's viewport to face a region of the spherical video containing character B. Otherwise, if the user's viewport is not oriented to coincide with inclusion zone A, the forced perspective event associated with inclusion zone A will not be triggered. Rather, either no forced perspective events will be triggered due to the user's viewport coinciding with none of the inclusion zones, or some other forced perspective event will be triggered if the user's viewport is oriented to coincide with any of the other inclusion zones B, C or D.

In order to provide interesting and varied experiences while drawing attention to certain content, an author/editor may establish several forced perspective events distributed across a given scene. For example, if the user's viewport was oriented to face character A, then the next forced perspective event would cause the user's viewport to be oriented to face character B with whom character A is arguing. As the argument in the scene progresses, the user may be compelled to keep his or her viewport fixed on character B such that a subsequent forced perspective event with an inclusion zone that coincides with character B would cause the user's viewport to switch back to an orientation that is fixed on character A. By contrast, a different user watching the same footage might, at the beginning of the scene, have caused their viewport to be oriented to face character B. The next forced perspective event could be established by the author/editor in association with an inclusion zone coinciding with character B that would in fact cause the orientation of the different user's viewport to switch to coincide with character A. As such, the author/editor will have established a sophisticated experience whereby two (or more) different users watching the same footage could have their perspectives forced differently thereby to receive slightly different scene-length experiences based on where their respective viewports were originally oriented when the first forced perspective event was to be triggered. The author/editor may use this functionality to enable the experiences of two different users to diverge based on what each were originally looking at, and then perhaps to converge again as the author/editor sees fit such that all users are looking at the same thing at the close of the scene, for example. This could be used in various ways. For example, an author/editor may anticipate that a female user may be inclined to gaze at attractive male characters in the footage, and the author/editor could use this consideration in conjunction with inclusion zones and forced perspectives to try to guide the female user's gaze to particular features in the footage as it progresses. At the same time, the author/editor may anticipate that a male user may be inclined to gaze at attractive female characters in the footage, such that the author/editor could use this consideration in conjunction with other inclusion zones and forced perspectives to try to guide the male user's gaze to particular other features in the footage as it progresses. Different users could therefore be guided along different experiences from the same footage, and would somewhat "self-select" which experience they would have based on their initial viewport orientation at the time the author/editor intended to begin the "guided" experience. As would be understood, such self-selecting would typically, particularly during a first watching of the footage, not be deliberate on the part of the users. However, later, two different users might with great interest discuss their respective experiences watching the same footage, having experienced it in contrasting ways, leading perhaps to the two different users being compelled to watch the footage again but to deliberately orient their viewports in a different way for the second and any subsequent viewings thereby to be "taken along" as others had been.

For example, one user originally fixated on an exotic car in some footage may be automatically, over time, forced to perspectives between a host in the scene discussing the car and back again to the car, over the course of a scene. Another user originally fixated on airplanes flying overhead in the same footage may not be automatically forced to any different perspective. In this case, the author/editor may feel that a user who is not demonstrating particular interest in the exotic car at the moment is more likely to enjoy continuing to gaze into the sky at the airplanes and would rather not be wrenched away from that experience. Yet another user watching the same footage may be gazing at pedestrians walking along a sidewalk looking excitedly at the exotic car and, because of the orientation of this other user's viewport, that user's viewport may automatically be forced back and forth to perspectives of pedestrians on one side of the street and on the other, rather than between the exotic car itself and the host who is being heard discussing it. At any point during such a scene if a user who has not previously been paying any attention to the exotic car decides to gaze at it for a period of time, then the subsequent forced perspectives that are triggered in connection with an inclusion zone corresponding to the car may allow the user to be "taken along" the above-mentioned series of intermittent forced perspectives that have been arranged by the author/editor with relevant inclusion zones to toggle between that exotic car and the talkative host.

In embodiments, a particular forced perspective event associated with an inclusion zone may be triggered only if the user's viewport has coincided with the inclusion zone for a threshold period of time. Thus, in such an embodiment, if a user is panning from left to right in the footage and happens during this activity to cause his or her viewport to temporarily (i.e., less than the threshold period) coincide with an inclusion zone at the time of an associated forced perspective, the digital media player will not trigger the forced perspective event. Only if the user's viewport coincides with the inclusion zone for at least the threshold period before the forced perspective event is to occur will the user's viewport be automatically forced to the associated perspective. This would, for example, enable an author/editor to set parameters on a forced perspective event to allow the eventual user to "look around" with a fair bit of freedom, but to be drawn into a narrative moment should the user provide enough indication (time spent looking at something particular) that he or she might be interested in paying attention to some feature of the footage that happens to correspond to an inclusion zone. Such a time threshold may be associated by authors/editors with some forced perspective events and not with others, and the amounts of time thresholds may be established by the author/editor individually for each forced perspective event and inclusion zone, or may be globally established for an entire scene or video.

It will be understood that the system for use by the author/editor during editing will function to enable the author/editor to retain the flexibility to define inclusion zones and their forced perspective events such that two or more inclusion zones may be associated with forced perspective events that orient the user's viewport in the same direction. For example, an author/editor may wish to arrange the forced perspective events and the inclusion zones such that a user watching either character A or character B during an argument would have their perspective forced to face character C, who may be watching characters A and B argue.

Figure 16A:
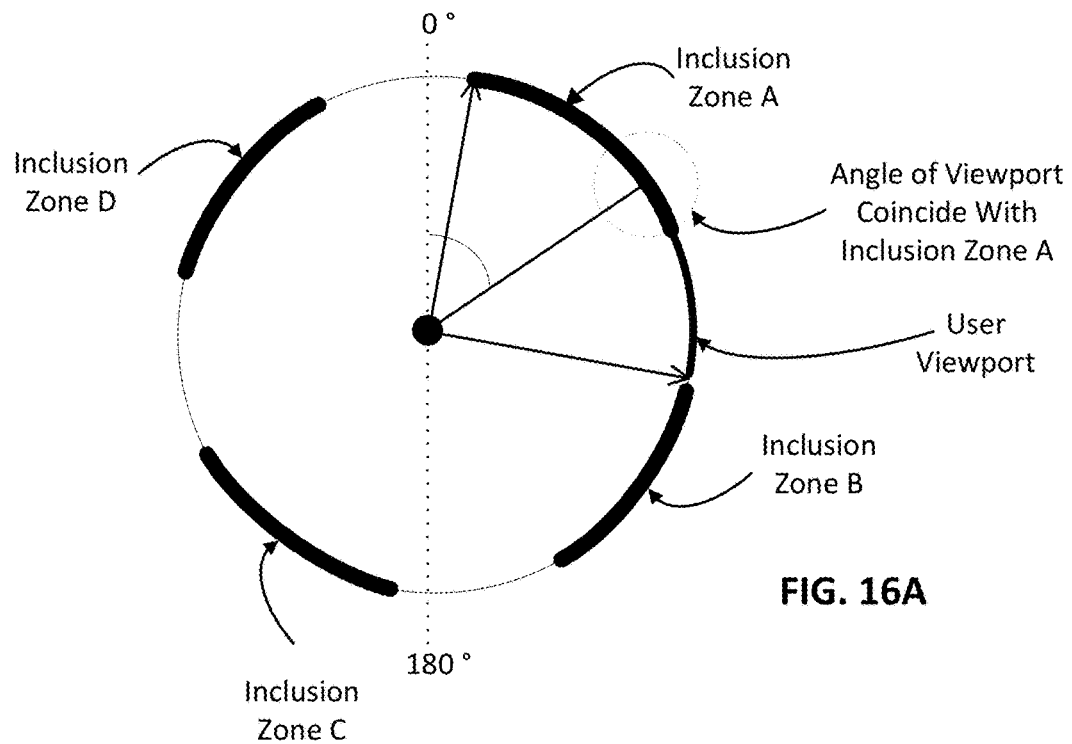
FIGS. 16A and 16B are top plan view diagrams of the sphere and inclusion zones of FIG. 15, showing an example user viewport coinciding with inclusion zone A thereby triggering a respective forced perspective event associated with inclusion zone A.
Figure 16B:
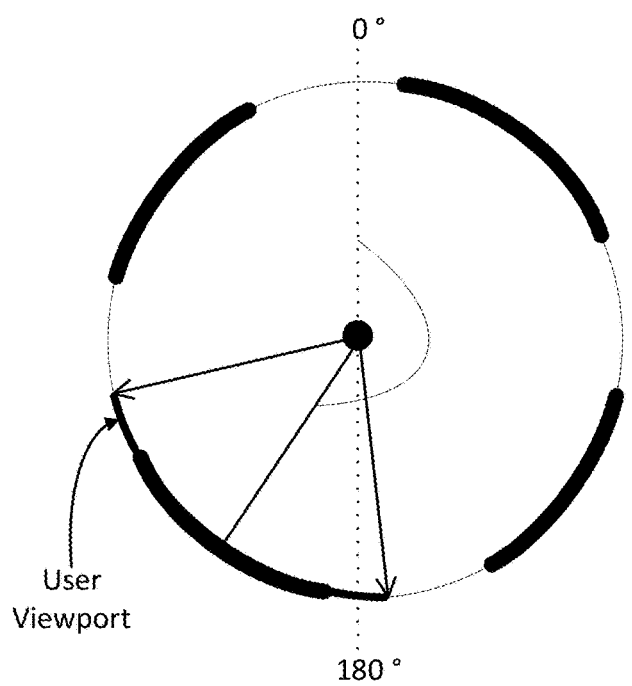

FIGS. 16A and 16B are top plan view diagrams of the sphere and inclusion zones of FIG. 15, showing an example user viewport coinciding with inclusion zone A thereby triggering a respective forced perspective event associated with inclusion zone A.

It will be noted that, in this example, the forced perspective event associated with inclusion zone A automatically causes the user's viewport to be oriented in a direction that actually coincides with inclusion zone C. In this embodiment, inclusion zones may each be associated by an author/ editor with a sequence of frames, rather than just one frame. With the user's viewport having been automatically oriented to coincide with inclusion zone C, it would not generally be desirable to, at the subsequent frame, immediately trigger the forced perspective that is associated with inclusion zone C thereby to automatically and immediately re-orient the user's viewport again. This is because the user's viewport will not have had a chance to "settle" in one orientation for long enough to allow the user to register what he or she is being oriented to see before being forced into another viewport orientation. As such, the digital media player is configured to distinguish between orientations of the user's viewport that are controlled by the digital media player (i.e. that were forced due to triggering of a forced perspective event), and orientations of the user's viewport that were voluntary (i.e. that were not forced due to a triggering of some forced perspective event). The digital media player can therefore avoid an unintended automatic loop or cascade of forced perspective events that would jar the user or thwart the author/editor's intentions as to what the user's viewport should be oriented to settle on. This may be done by the digital media player being instructed or being configured to limit the number of triggered forced perspective events to one per sequence of frames (such as one per 100 frames which, at 30 frames per second would be approximately one every 3 seconds), and/or to one per time period (such as one every approximately 3 seconds), and/or to one per "set" of alternate forced perspective events. Such thresholds may be established by the author/editor during editing, or may be established as defaults.

Figure 17A:
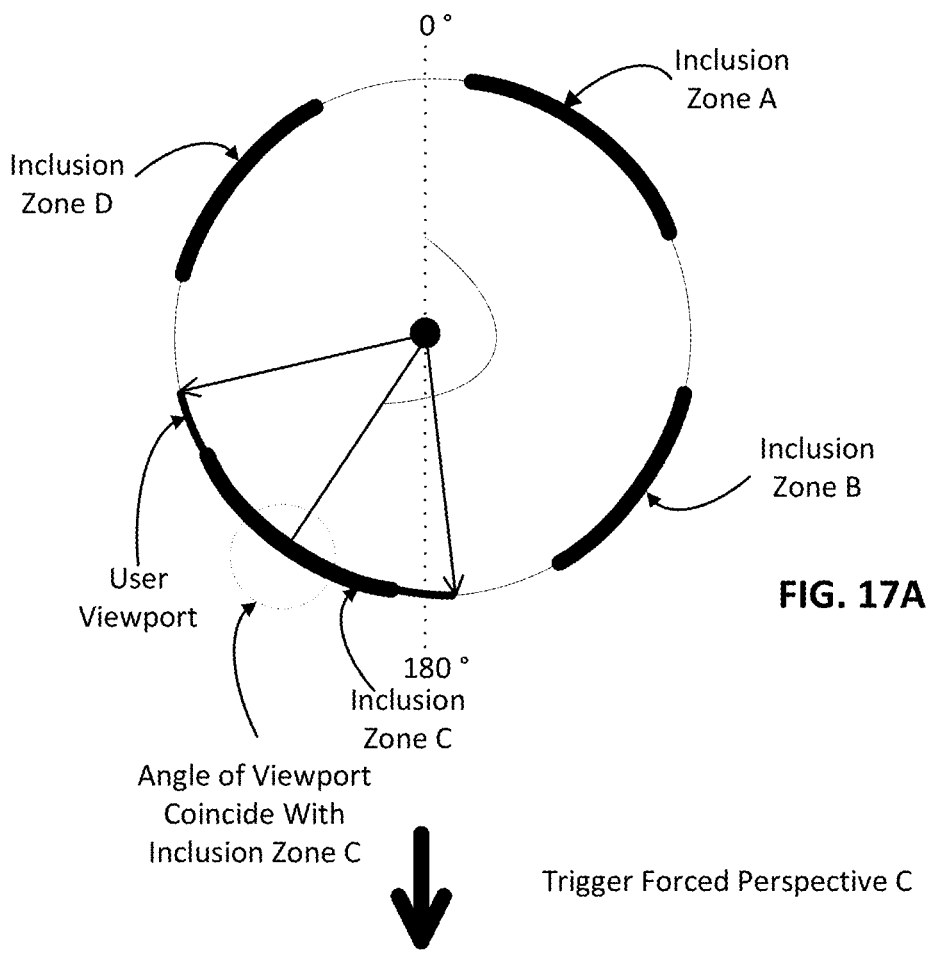
FIGS. 17A and 17B are top plan view diagrams of the sphere and inclusion zones of FIG. 15, showing an example user viewport coinciding with inclusion zone C thereby triggering a respective forced perspective event associated with inclusion zone C.
Figure 17B:
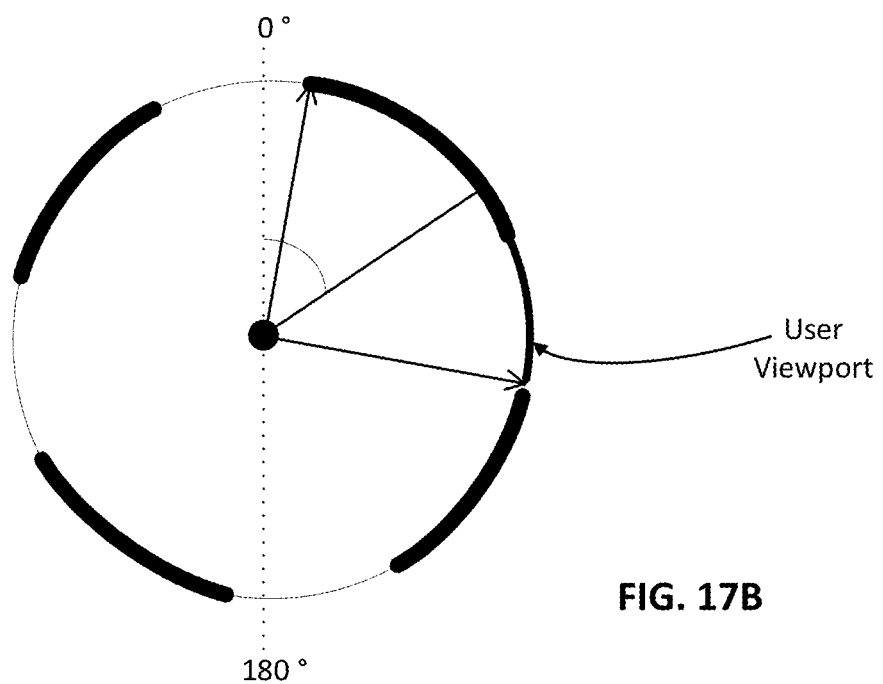

FIGS. 17A and 17B are top plan view diagrams of the sphere and inclusion zones of FIG. 15, showing an example user viewport coinciding with inclusion zone C thereby triggering a respective forced perspective event associated with inclusion zone C.

Figure 18A:
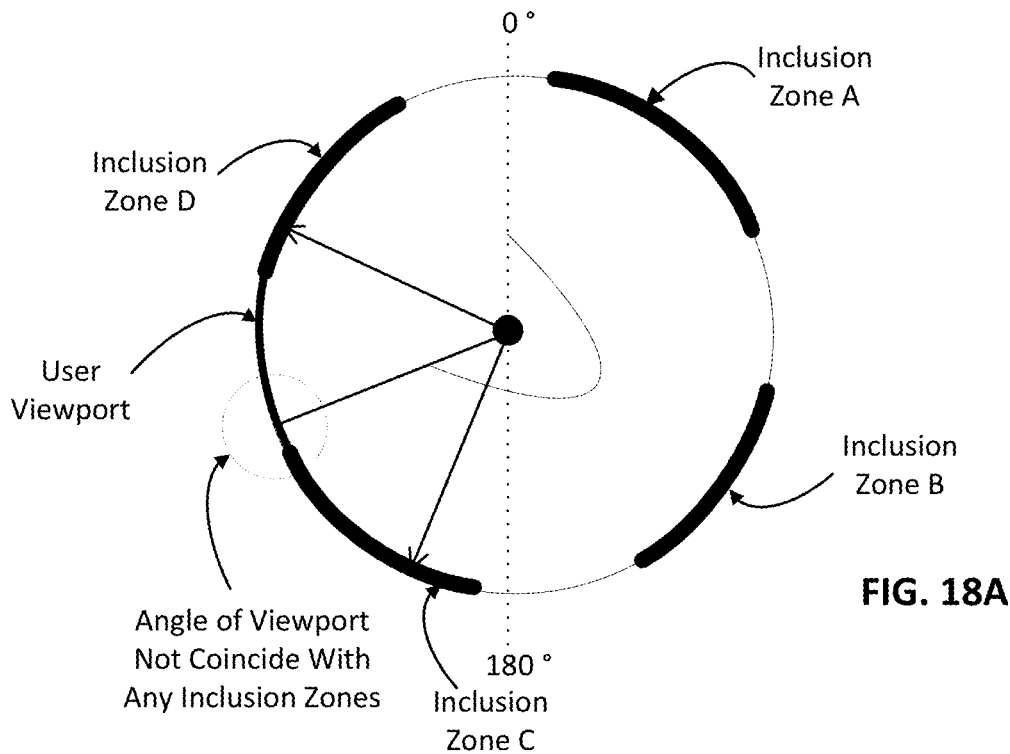
FIGS. 18A and 18B are top plan view diagrams of the sphere and inclusion zones of FIG. 15, showing an example user viewport coinciding with none of inclusion zones A, B, C and D, thereby representing conditions preventing triggering of any forced perspective events.
Figure 18B:
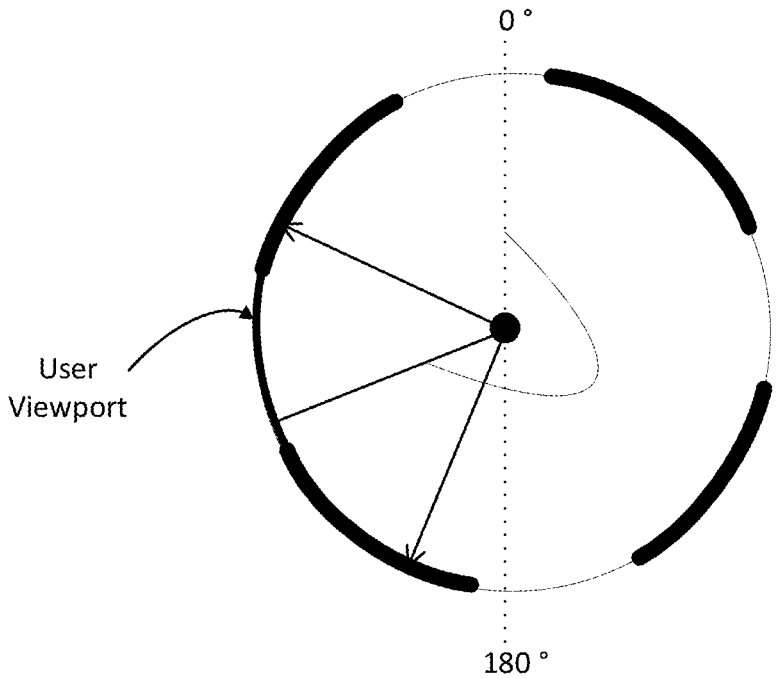

FIGS. 18A and 18B are top plan view diagrams of the sphere and inclusion zones of FIG. 15, showing an example user viewport coinciding with none of inclusion zones A, B, C and D, thereby representing conditions preventing triggering of any forced perspective events.

Figure 19:
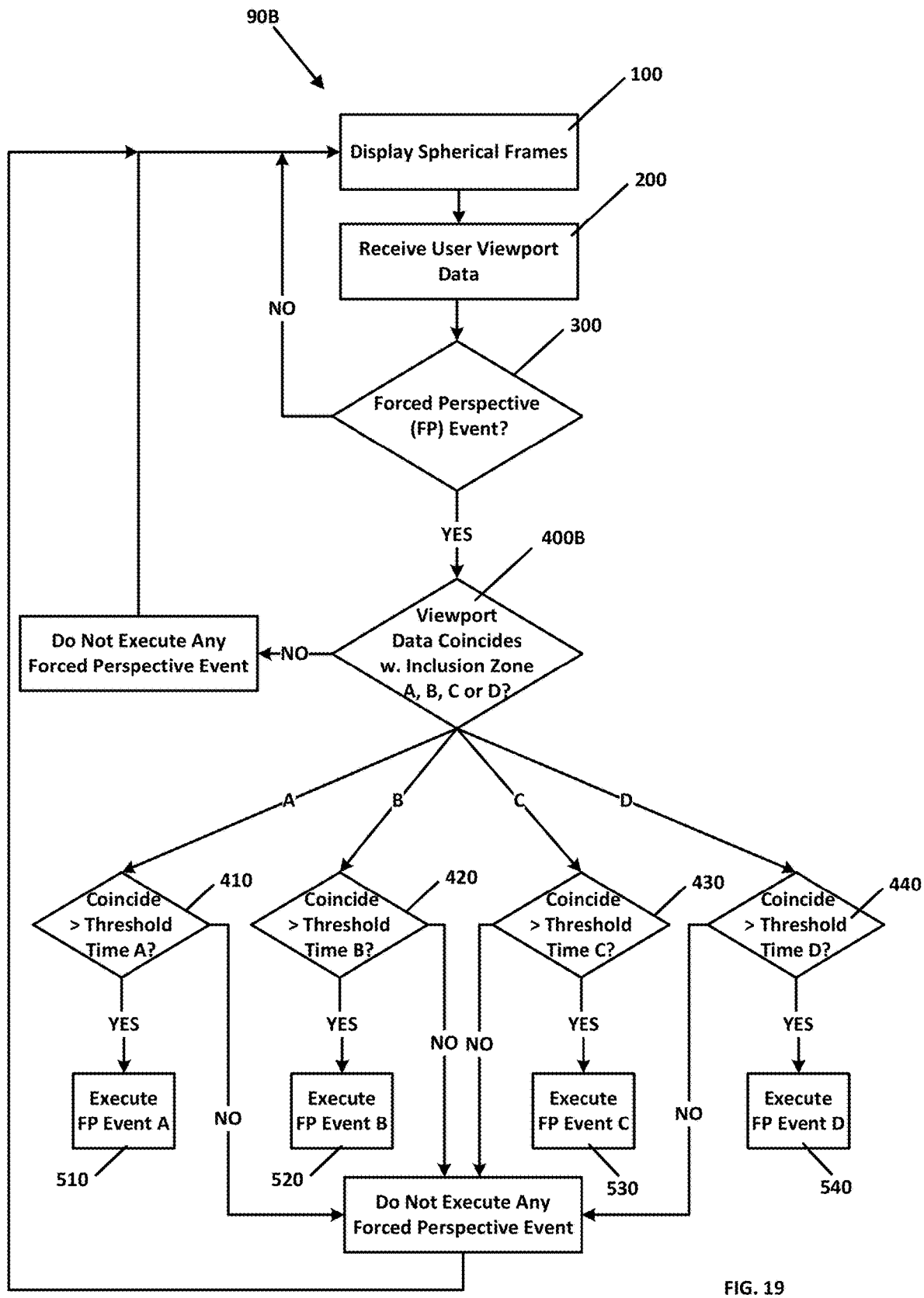
FIG. 19 is a flowchart depicting steps in a process, according to an embodiment.

FIG. 19 is a flowchart depicting steps in a process 90B for processing digital video for display on a digital media player, according to an alternative embodiment. Process 90B is similar to process 90A described above, with the exception that multiple forced perspective events A, B, C and D are defined in association with respective different inclusion zones A, B, C, D such that process 90B triggers one of the forced perspective (FP) events A, B, C, D during display of a particular frame (or frame sequence) only if the user's viewport coincides with a respective inclusion zone A, B, C, D. Furthermore, a time parameter is defined in association with a respective one of the forced perspective events A, B, C, D—namely Time A, Time B, Time C and Time D. The time parameter relates to a duration for which the user's viewport coincides with a respective inclusion zone such that, only if (at the time of triggering the forced perspective) the user's viewport has coincided with the inclusion zone for a duration that is at least as long as its respective time parameter (such as, for example, 2 seconds, or 60 frames, or some other suitable amount to be established by the author/ editor or by default) will the respective forced perspective event in fact be triggered. During process 90B, spherical frames of digital video are displayed (step 100) and user viewport data is received (step 200). In the event that a forced perspective event is to be triggered (step 300) upon display of a particular frame, it is then determined at step 400B whether the viewport data coincides with any of inclusion zones A, B, C, D that have been defined in association with respective forced perspective events A, B, C, D for that frame (or frame sequence). In the event that the viewport data does not coincide with any such inclusion zones (step 400B), the process 90B continues without executing any forced perspective events to display spherical frames (step 100). Otherwise, process 90B continues to one of steps 410, 420, 430, 440 to determine whether the user's viewport has coincided with the respective inclusion zone for the respective threshold time. In the event that the viewport data has not coincided with the respective inclusion zone for the respective threshold time, the process 90B continues without executing any forced perspective events to display spherical frames (step 100). Otherwise, the respective forced perspective event (one of FP Event A, FP Event B, FP Event C, FP Event D) is executed (i.e. triggered), as shown in one of steps 510, 520, 530, and 540.

It will be understood that alternative processes to process 90B are possible. For example, a given inclusion zone may not have any time threshold associated with it, while another inclusion zone does have a time threshold associated with it. Or, the process 90B could be executed without steps 410, 420, 430, 440 simply to execute respective forced perspective events with no condition other than the condition that the user's viewport coincides with the respective inclusion zone at the time the forced perspective event is to be triggered.

It will be understood that the threshold period of time parameter referred to above may be employed in connection with exclusion zones also, such that a forced perspective event associated with an exclusion zone would be executed even if the user happened to be gazing into an associated exclusion zone, provided the user had been gazing into that exclusion zone for less than a respective threshold period of time beforehand. While the uses of a threshold time period for an exclusion zone may have fewer applications than for an inclusion zone, the flexibility could be useful for the author/editor. For example, a user quickly scanning his or her viewport through a particular exclusion zone on his or her way to gaze at a different region may not tend to experience a forced perspective event in the same way that a user who has spent a threshold amount of time gazing through a viewport that coincides with the exclusion zone. One of these experiences could be more or less jarring than the other. In this way, the author/editor could fine-tune the digital video experience to account for different users' behaviours in this respect at the time during which the forced perspective event is to be triggered.

The principles described herein are applicable to modifying whether a forced perspective event is triggered based on a condition related to in which direction a user is gazing at the time the forced perspective event is to be triggered, and optionally the duration for which the user was gazing in the direction.

What is claimed is:

1. A processor-implemented method in a digital media player, the method comprising:
   receiving data defining a user's viewport in relation to spherical video frames displayed by the digital media player; and
   where a forced perspective event is to be triggered at the time of display of a spherical frame, triggering the forced perspective event conditionally based at least on the orientation of the user's viewport in relation to the spherical video frames,
   wherein triggering the forced perspective event conditionally comprises triggering the forced perspective event only if the user's viewport does not coincide for a threshold duration with an exclusion zone associated with the spherical frame.

2. A processor-implemented method in a digital media player, the method comprising:
  receiving data defining a user's viewport in relation to spherical video frames displayed by the digital media player; and
  where a forced perspective event is to be triggered at the time of display of a spherical frame, triggering the forced perspective event conditionally based at least on the orientation of the user's viewport in relation to the spherical video frames,
  where one of a plurality of forced perspective events is to be triggered at the time of display of the spherical frame, selecting none or one of the plurality of forced perspective events to be triggered conditionally based at least on the orientation of the user's viewport in relation to the spherical video frames, the selecting comprising selecting a forced perspective event only if the user's viewport coincides for a threshold duration with an inclusion zone associated with the selected forced perspective event; and
  in the event that one of the plurality of forced perspective events is selected, triggering the selected forced perspective event.

3. A digital media player comprising:
  processing structure for:
    receiving data defining a user's viewport in relation to spherical video frames displayed by the digital media player; and
    where a forced perspective event is to be triggered at the time of display of a spherical frame, triggering the forced perspective event conditionally based at least on the orientation of the user's viewport in relation to the spherical video frames,
    wherein triggering the forced perspective event conditionally comprises triggering the forced perspective event only if the user's viewport does not coincide for a threshold duration with an exclusion zone associated with the spherical frame.

4. A digital media player comprising:
  processing structure for:
    receiving data defining a user's viewport in relation to spherical video frames displayed by the digital media player; and
    where a forced perspective event is to be triggered at the time of display of a spherical frame, triggering the forced perspective event conditionally based at least on the orientation of the user's viewport in relation to the spherical video frames,
    wherein triggering the forced perspective event conditionally comprises triggering the forced perspective event only if the user's viewport coincides with an inclusion zone associated with the spherical frame.

5. A digital media player comprising:
  processing structure for:
    receiving data defining a user's viewport in relation to spherical video frames displayed by the digital media player;
    where a forced perspective event is to be triggered at the time of display of a spherical frame, triggering the forced perspective event conditionally based at least on the orientation of the user's viewport in relation to the spherical video frames;
  where one of a plurality of forced perspective events is to be triggered at the time of display of the spherical frame, selecting none or one of the plurality of forced perspective events to be triggered conditionally based at least on the orientation of the user's viewport in relation to the spherical video frames, the selecting comprising selecting a forced perspective event only if the user's viewport coincides for a threshold duration with an inclusion zone associated with the selected forced perspective event; and
    in the event that one of the plurality of forced perspective events is selected, triggering the selected forced perspective event.

6. A non-transitory processor-readable medium embodying a computer program for a digital media player, the computer program comprising:
  program code for receiving data defining a user's viewport in relation to spherical video frames displayed by the digital media player; and
  program code for, where a forced perspective event is to be triggered at the time of display of a spherical frame, triggering the forced perspective event conditionally based at least on the orientation of the user's viewport in relation to the spherical video frames,
  wherein the program code for triggering the forced perspective event conditionally comprises program code for triggering the forced perspective event only if the user's viewport does not coincide for a threshold duration with an exclusion zone associated with the spherical frame.

7. A non-transitory processor-readable medium embodying a computer program for a digital media player, the computer program comprising:
  program code for receiving data defining a user's viewport in relation to spherical video frames displayed by the digital media player; and
  program code for, where a forced perspective event is to be triggered at the time of display of a spherical frame, triggering the forced perspective event conditionally based at least on the orientation of the user's viewport in relation to the spherical video frames,
  wherein the program code for triggering the forced perspective event conditionally comprises program code for triggering the forced perspective event only if the user's viewport coincides with an inclusion zone associated with the spherical frame.

8. A non-transitory processor-readable medium embodying a computer program for a digital media player, the computer program comprising:
  program code for receiving data defining a user's viewport in relation to spherical video frames displayed by the digital media player;
  program code for, where a forced perspective event is to be triggered at the time of display of a spherical frame, triggering the forced perspective event conditionally based at least on the orientation of the user's viewport in relation to the spherical video frames;
  program code for, where one of a plurality of forced perspective events is to be triggered at the time of display of the spherical frame, selecting none or one of the plurality of forced perspective events to be triggered conditionally based at least on the orientation of the user's viewport in relation to the spherical video frames, the selecting comprising selecting a forced perspective event only if the user's viewport coincides for a threshold duration with an inclusion zone associated with the selected forced perspective event; and program code for, in the event that one of the plurality of forced perspective events is selected, triggering the selected forced perspective event.

* * * * *